US010448225B2

(12) United States Patent
Kimura

(10) Patent No.: US 10,448,225 B2
(45) Date of Patent: Oct. 15, 2019

(54) DEVICE AND METHOD

(71) Applicant: SONY CORPORATION, Tokyo (JP)

(72) Inventor: Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/768,279

(22) PCT Filed: Aug. 1, 2016

(86) PCT No.: PCT/JP2016/072506
§ 371 (c)(1),
(2) Date: Apr. 13, 2018

(87) PCT Pub. No.: WO2017/068832
PCT Pub. Date: Apr. 27, 2017

(65) Prior Publication Data
US 2018/0302769 A1 Oct. 18, 2018

(30) Foreign Application Priority Data
Oct. 20, 2015 (JP) .................. 2015-206160

(51) Int. Cl.
H04W 4/00 (2018.01)
H04W 4/40 (2018.01)
(Continued)

(52) U.S. Cl.
CPC ............ *H04W 4/40* (2018.02); *H04L 12/189* (2013.01); *H04M 11/04* (2013.01); *H04W 4/06* (2013.01);
(Continued)

(58) Field of Classification Search
CPC ....... H04W 4/40; H04W 68/005; H04W 4/06; H04W 76/10; H04W 72/005;
(Continued)

(56) References Cited

U.S. PATENT DOCUMENTS 8,160,563 B2* 4/2012 Chen .................. H04L 12/1895
455/419
9,148,748 B2* 9/2015 Wang ...................... H04W 4/70
(Continued)

FOREIGN PATENT DOCUMENTS

EP 2509357 A1 * 10/2012 ............ H04W 88/16
JP 2001-339536 A 12/2001
(Continued)

OTHER PUBLICATIONS

International Search Report dated Oct. 11, 2016 in PCT/JP2016/072506.
(Continued)

Primary Examiner — Mahendra R Patel
(74) Attorney, Agent, or Firm — Xsensus LLP

(57) ABSTRACT

To further improve certainty of security assurance using a cellular system.
[Solution] A device including: a communication unit configured to perform wireless communication; an acquiring unit configured to acquire, via the wireless communication, information related to a response destination of a message transmitted from a base station via the wireless communication; and a processing unit configured to execute a process related to a response to the response destination on the message on a basis of the acquired information related to the response destination.

16 Claims, 25 Drawing Sheets

(51) Int. Cl.
*H04M 11/04* (2006.01)
*H04W 48/16* (2009.01)
*H04W 4/06* (2009.01)
*H04W 4/12* (2009.01)
*H04W 4/16* (2009.01)
*H04L 12/18* (2006.01)
*B60Q 9/00* (2006.01)
*H04W 68/00* (2009.01)
*H04L 29/08* (2006.01)
*H04M 1/60* (2006.01)
*H04M 1/725* (2006.01)

(52) U.S. Cl.
CPC .............. *H04W 4/12* (2013.01); *H04W 4/16* (2013.01); *H04W 48/16* (2013.01); *B60Q 9/00* (2013.01); *H04L 67/12* (2013.01); *H04M 1/6075* (2013.01); *H04M 1/72536* (2013.01); *H04M 1/72552* (2013.01); *H04W 68/005* (2013.01)

(58) Field of Classification Search
CPC ....... H04W 28/06; H04W 4/04; H04W 48/16; G06F 15/16; G06Q 30/00; H04Q 7/20; H04L 1/16; H04L 12/189; H04L 5/001; H04L 5/0023; B60Q 9/00; H04M 1/00; H04M 11/04
USPC .................................... 455/466; 1/1; 370/312
See application file for complete search history.

(56) References Cited

U.S. PATENT DOCUMENTS

| | | | | |
|---|---|---|---|---|
| 2010/0057485 A1* | 3/2010 | Luft | ........................ | H04W 4/70 455/411 |
| 2011/0199905 A1* | 8/2011 | Pinheiro | ........... | H04W 28/0215 370/235 |
| 2011/0201365 A1* | 8/2011 | Segura | .................... | H04W 4/70 455/466 |
| 2011/0256896 A1* | 10/2011 | Giaretta | .................. | H04W 4/00 455/509 |
| 2012/0207094 A1* | 8/2012 | Liao | ........................ | H04W 4/70 370/328 |
| 2012/0311101 A1* | 12/2012 | Chao | ..................... | H04L 12/189 709/219 |
| 2013/0080597 A1* | 3/2013 | Liao | ...................... | H04L 5/0001 709/219 |
| 2013/0084894 A1* | 4/2013 | Jain | ......................... | H04W 4/70 455/458 |
| 2013/0136072 A1* | 5/2013 | Bachmann | .............. | H04W 4/70 370/329 |
| 2013/0188547 A1* | 7/2013 | Moriwaki | ........... | H04W 72/005 370/312 |
| 2013/0339438 A1* | 12/2013 | Cherian | .................. | H04W 4/08 709/204 |
| 2014/0242952 A1* | 8/2014 | Zhang | ..................... | H04W 4/70 455/411 |
| 2015/0208232 A1* | 7/2015 | Liebhart | ............... | H04L 61/106 370/328 |
| 2015/0223028 A1* | 8/2015 | Wang | ..................... | H04W 4/70 370/312 |
| 2016/0007316 A1* | 1/2016 | Vaidya | .................. | H04W 68/02 370/312 |
| 2016/0198049 A1* | 7/2016 | Iwai | ...................... | H04M 15/66 455/406 |

FOREIGN PATENT DOCUMENTS

| | | | | |
|---|---|---|---|---|
| JP | 2014-197331 A | 10/2014 | | |
| WO | WO 2011/083729 A1 | 7/2011 | | |
| WO | WO 2012151819 A1 * | 11/2012 | ............. | H04W 4/70 |
| WO | 2014/061198 A1 | 4/2014 | | |
| WO | WO 2014/053084 A1 | 4/2014 | | |

OTHER PUBLICATIONS

Extended European Search Report dated Apr. 25, 2019 in European Application No. 16857150.3-1221.

\* cited by examiner

DEVICE AND METHOD

TECHNICAL FIELD

The present disclosure relates to a device and a method.

BACKGROUND ART

A transportation system called an intelligent transport system (ITS) is known as a transportation system for operating transportation such as automobiles or trains, and studies on high-functional high-speed ITSs have been conducted. Particularly, in an ITS, implementation of a so-called vehicle-to-X (V2X) communication function such as between vehicles (vehicle-to-vehicle (V2V)) or between a vehicle and infrastructure (vehicle-to-infrastructure (V2I)) is under review, and connection by wireless communication is more desirable in consideration of mobility of vehicles.

CITATION LIST

Patent Literature

Patent Document 1: JP 2001-339536A

DISCLOSURE OF INVENTION

Technical Problem

Meanwhile, in a case in which a vehicle is recalled, information related to so the recall is reported to customers through, for example, an announcement through news by newspaper, television, radio or the like, a notification through an automobile company or a dealership, or the like. However, in such an announcement method, since it is difficult to check whether or not information has reached the customers, improvements in a delivery method of recall information or the like are required.

On the other hand, application of a so-called cellular system widely used in mobile phones, smart phones, or the like to transportation systems such as ITSs is under review. Particularly, in a cellular system, a mechanism for delivering a message such as an earthquake and tsunami warning system (ETWS) is specified and implemented. If such a message delivery mechanism is used for delivering the recall information or the like, the information is expected to be able to be delivered to the target customers more reliably.

On the other hand, in a case in which an existing cellular system is simply used, for example, it may be difficult to further improve certainty of security assurance after delivering information to terminal devices.

Therefore, the present disclosure proposes a device and a method which are capable of further improving certainty of security assurance using a cellular system.

Solution to Problem

According to the present disclosure, there is provided a device including: a communication unit configured to perform wireless communication; an acquiring unit configured to acquire, via the wireless communication, information related to a response destination of a message transmitted from a base station via the wireless communication; and a processing unit configured to execute a process related to a response to the response destination on the message on a basis of the acquired information related to the response destination.

In addition, according to the present disclosure, there is provided a device including: a generating unit configured to generate information related to a response destination of a message for executing a process related to a response to the message to the response destination by a terminal corresponding to a delivery target of the message; and a control unit configured to control communication such that the generated information related to the response destination is associated with the message and transmitted to the terminal.

In addition, according to the present disclosure, there is provided a device including: an acquiring unit configured to acquire information related to a response destination of a message for executing a process related to a response to the message to the response destination by a terminal corresponding to a delivery target of the message; and a control unit configured to control communication with another device serving as a control target such that the acquired information related to the response destination is delivered to the terminal.

In addition, according to the present disclosure, there is provided a method including: performing wireless communication; acquiring, via the wireless communication, information related to a response destination of a message transmitted from a base station via the wireless communication; and executing, by a processor, a process related to a response to the response destination on the message on a basis of the acquired information related to the response destination.

In addition, according to the present disclosure, there is provided a method including, by a processor: generating information related to a response destination of a message for executing a process related to a response to the message to the response destination by a terminal corresponding to a delivery target of the message; and controlling communication such that the generated information related to the response destination is associated with the message and transmitted to the terminal.

In addition, according to the present disclosure, there is provided a method including: acquiring information related to a response destination of a message for executing a process related to a response to the message to the response destination by a terminal corresponding to a delivery target of the message; and controlling, by a processor, communication with another device serving as a control target such that the acquired information related to the response destination is delivered to the terminal.

Advantageous Effects of Invention

As described above, according to the present disclosure, a device and a method which are capable of further improving certainty of security assurance using a cellular system are provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
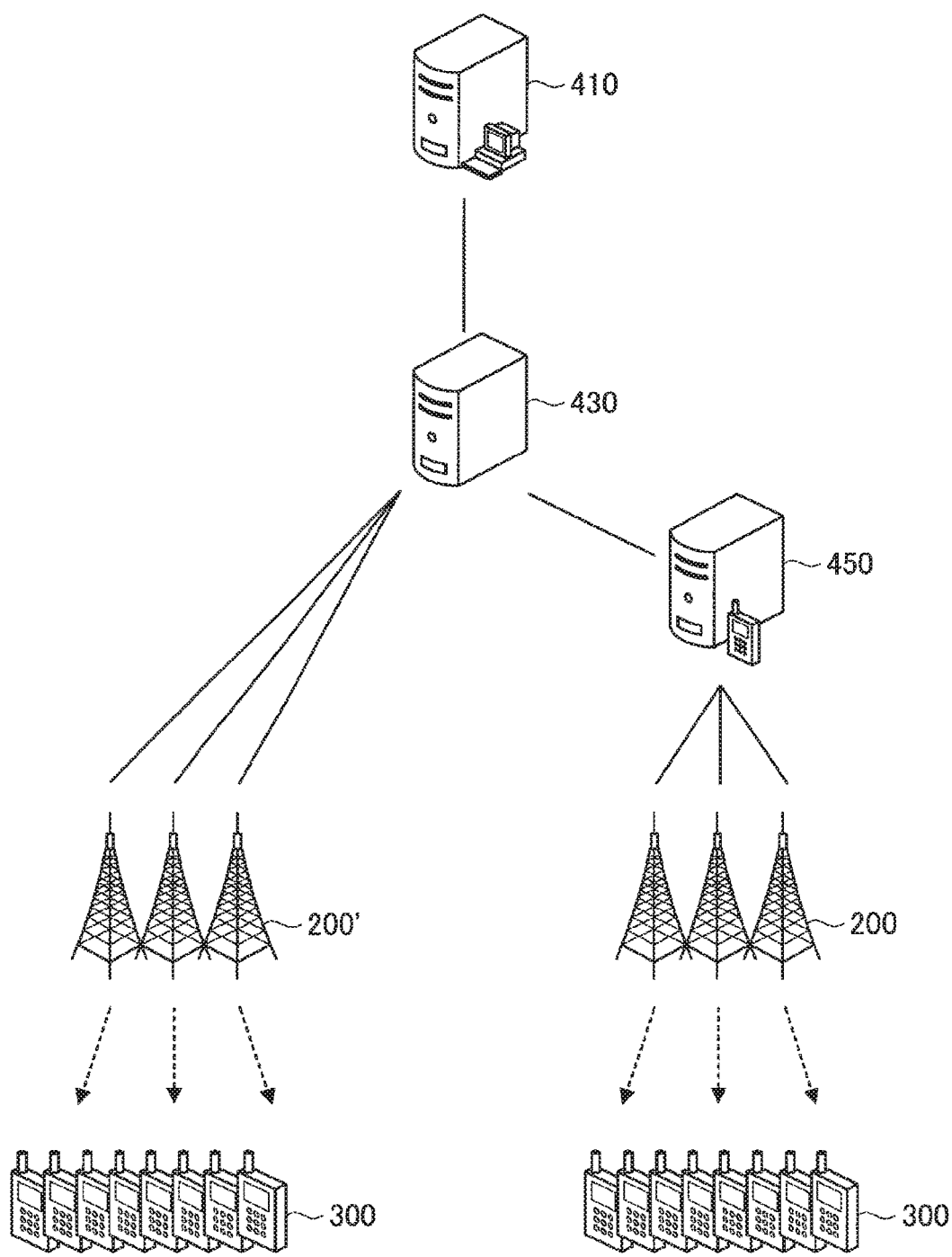
FIG. 1 is an explanatory diagram for describing an overview of an ETWS.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. ETWS
2. Technical problem
3. Configuration example
3.1. Communication system
3.2. Communication control device
3.3. Base station
3.4. Terminal device
4. Technical features
4.1. Example of message delivery flow
4.2. Specifying of delivery target by CBE
4.3. Generation of message and specifying of delivery target by CBC
4.4. Specifying of delivery area by MME
4.5. Message delivery by base station
4.6. Operation of terminal device receiving delivery of message 4.7. Message delivery list management
5. Application examples
5.1. Application example related to communication control device
5.2. Application example related to base station
5.3. Application example related to terminal device
6. Conclusion

«1. ETWS»

In cellular systems (or mobile communication systems) represented by 3G, Long Term Evolution (LTE), and LTE-advanced (LTE-A), an ETWS is defined and implemented. First, an overview of the ETWS will be described with reference to FIG. 1 and FIG. 2.

For example, FIG. 1 is an explanatory diagram for describing an overview of the ETWS, and illustrates an example of a configuration of the ETWS specified in 3GPP. The ETWS is mainly used for delivery of emergency messages, but the ETWS can be used not only for delivery of emergency information at the time of a disaster or the like but also for delivery of information other than emergency information.

As illustrated in FIG. 1, in the system configuration of the ETWS, for example, in the case of 3G, a cell broadcast entity (CBE) 410, a cell broadcast center (CBC) 430, a radio network controller (RNC) 200', and a terminal device (UE) 300 are included. Further, the terminal device 300 is also referred to as a user. The user may also be referred to as a user equipment (UE). Here, the UE may be a UE defined in LTE or LTE-A and may indicate a communication device more generally. Further, in the following description, LTE and LTE-A are also collectively referred to simply as "LTE."

The CBE 410 corresponds to a message delivery source. For example, in a case in which an emergency message such as an earthquake alert or a tsunami alert is delivered, the meteorological office corresponds to the CBE 410. In a case in which the necessity of message delivery occurs in the CBE 410, the CBC 430 corresponding to an information delivery server in the cellular system accepts a message delivery request from the CBE 410 and generates a corresponding delivery message.

Further, in the case of 3G, the CBC 430 transmits the message delivery request to the RNC 200' corresponding to a wireless control device. In response to the message delivery request transmitted from the CBC 430, the RNC 200' delivers (for example, broadcasts) the message to the terminal devices 300 subordinate thereto.

Further, in the case of LTE, a mobility management entity (MME) 450 and a base station (eNode B (eNB)) 200 are installed between the CBC 430 and the UE 300 in place of the RNC 200'. In other words, the MME 450 is interposed between the CBC 430 and the base station 200. With such a configuration, even in a case in which the number of base stations (eNB) 200 increases, it is possible to perform control such that no direct load is applied to the CBC 430.

Further, the base station 200 is a base station of the cellular system. The base station 200 performs wireless communication with the terminal device 300 located within a cell. For example, the base station 200 transmits a downlink signal to the terminal device 300 and receives an uplink signal from the terminal device 300. Here, the base station 200 may be a base station assumed in a multi-cell system such as a heterogeneous network (HetNet) or small cell enhancement (SCE). In other words, the base station 200 may be a macrocell base station that manages a so-called macrocell area or a small cell base station that manages a so-called small cell area.

Figure 2:
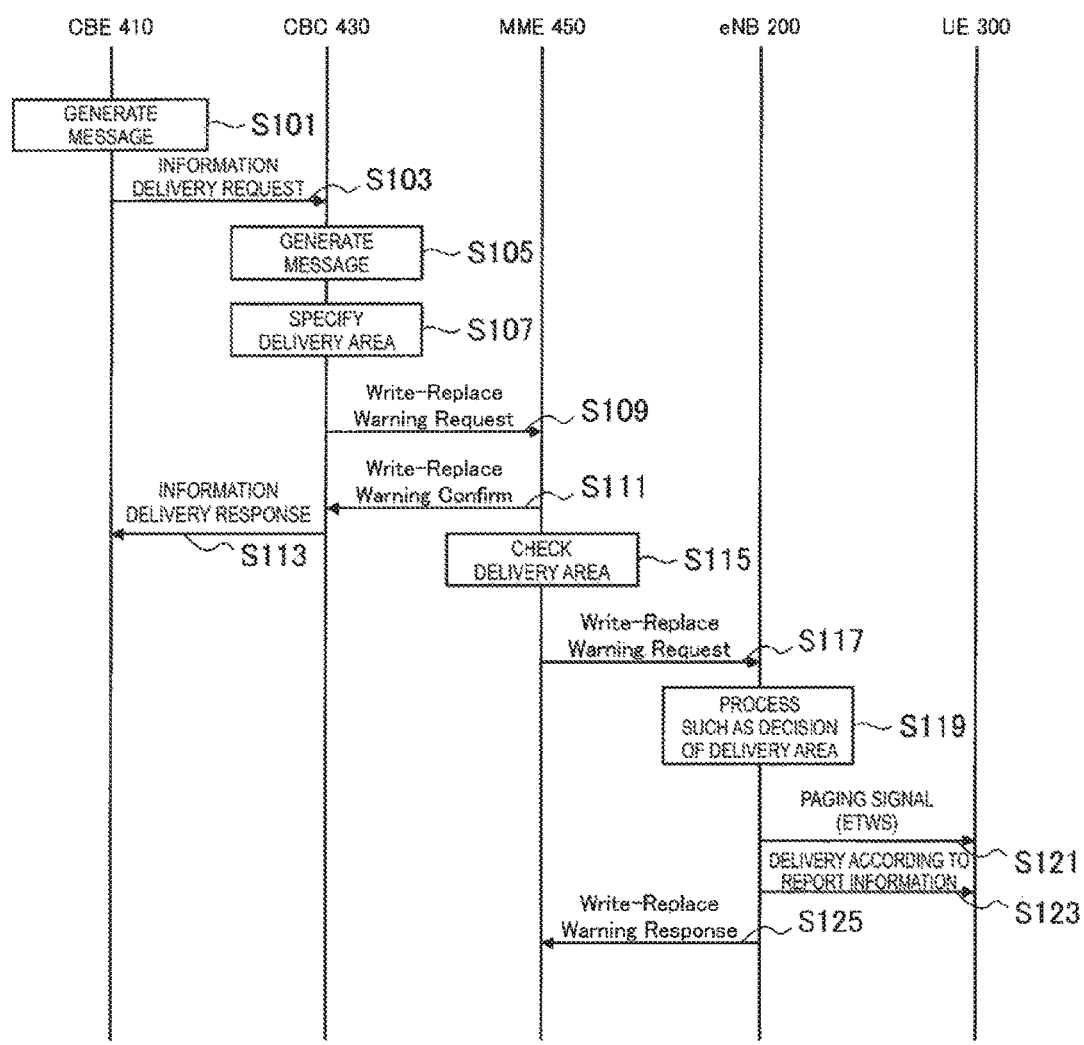
FIG. 2 is a sequence diagram illustrating an example of a delivery flow of an ETWS in LTE.

Further, the terminal device 300 performs wireless communication with the base station 200 in the cellular system. For example, the terminal device 300 receives a downlink signal from the base station 200 and transmits an uplink signal Here, an example of a delivery flow of the ETWS in LTE will be described with reference to FIG. 2. FIG. 2 is a sequence diagram illustrating an example of a delivery flow of the ETWS in LTE.

In a case in which the necessity of message delivery (an event or the like) occurs in the CBE 410 (S101), the CBE 410 transmits a request related to the message delivery (hereinafter also referred to as an "information delivery request") to the CBC 430 (S103). The CBC 430 generates a message in accordance with the information delivery request from the CBE 410 (S105), and specifies an area to which the generated message is delivered (S107). Then, the CBC 430 transmits a delivery request (for example, Write-Replace Warning Request) to the MME 450 that manages the specified area (S109). Upon receiving the delivery request from the CBC 430, the MME 450 transmits a response (for example, Write-Replace Warning Confirm) indicating delivery of the message to the CBC 430 (S111). Upon receiving the response to the delivery request from the MME 450, the CBC 430 transmits information indicating the response to the information delivery request to the CBE 410 which is a transmission source of the information delivery request as a response to the information delivery request (hereinafter also referred to as an "information delivery response") (S113).

The MME 450 checks the base station 200 located in the area serving as the delivery target of the message from among the base stations (eNB) 200 subordinate thereto (S115) and transmits a delivery request (for example, Write-Replace Warning Request) to the base station 200 (S117). In a case in which there are a plurality of sectors or cells subordinate to the base station 200, the base station 200 which has received the delivery request executes a process such as decision of a delivery area (S119) and delivers a message to the terminal device 300.

Further, as a procedure of message delivery from the base station 200 to the terminal device 300, the base station 200 first gives a notification indicating that the message will be delivered to the terminal device 300 by transmitting a paging signal to the terminal device 300 (S121). Further, the base station 200 then delivers the message to the terminal device 300 as report information (S123). Further, in a case in which the transmission of the message to the terminal device 300 is completed, the base station 200 transmits a response (for example, Write-Replace Warning Confirm) to the MME 450 (S125).

The overview of the ETWS has been described above with reference to FIGS. 1 and 2.

«2. Technical Problem»

Next, a technical problem related to the present disclosure will be described.

(Application of the ETWS to Transportation System)

As described above, the ETWS can be used not only for delivery of emergency information at the time of a disaster or the like but also for delivery of information other than emergency information. In this regard, for example, the application to transportation systems for managing transportation such as automobiles or trains safely and more efficiently is under review.

Specifically, a transportation system called an ITS is known as a transportation system for operating transportation such as automobiles or trains, and studies on high-function high-speed ITSs have been conducted. Particularly, in an ITS, implementation of a so-called vehicle-to-X (V2X) communication function such as between vehicles (vehicle-to-vehicle (V2V)) or between a vehicle and infrastructure (vehicle-to-infrastructure (V2I)) is under review, and connection by wireless communication is more desirable in consideration of mobility of vehicles.

As a communication system for an ITS, there are dedicated standards such as dedicated short range communications (DSRC) dedicated to transportation systems or IEEE802.11p extended from wireless LANs for ITSs.

On the other hand, as the communication system for an ITS, diverting a so-called cellular system widely used in mobile phones, smart phones, or the like is also considered as a candidate. Particularly, in a case in which the application to general vehicles is considered, if a terminal of a cellular system which is already widely used is mounted instead of mounting a device having a function of a dedicated standard, there is a possibility of introduction being less difficult, and a cost also being low.

(Information Delivery for Accident Prevention, Safety Assurance, and Recall)

One function required in an ITS is implementation of prior accident prevention and safety assurance. For example, one cause of accidents is vehicles that have been recalled. Currently, in a case in which a recall occurs, information related to the recall (hereinafter also referred to as "recall information") is reported to customers through, for example, an announcement through news by newspaper, television, radio or the like, a notification through an automobile company or dealership, or the like. On the other hand, in such an announcement method, cases in which the recall information does not reach customers who have the target vehicle are also assumed, and there are cases in which it is difficult to check whether the recall information has not arrived (or has arrived). Therefore, improvements in the delivery method of the recall information or the like are required.

In light of such a situation, for example, using the cellular system described above (for example, a communication system and a communication scheme) as the method for delivering the recall information is considered. Particularly, if the recall information is delivered using a system which is more widely used such as the cellular system or the like, the recall information is expected to be able to be delivered to target customers more reliably.

However, in the current cellular system, it may be difficult to meet conditions required by an ITS. More specifically, in the existing ETWS, a message (report information) is unilaterally delivered to the terminal device 300, and it may be difficult for the message delivery source (for example, the CBE 410) to check if the message arrives at the delivery destination. Therefore, if the existing ETWS is simply used, it may be difficult to improve certainty of security assurance after the terminal device 300 (an automobile, a bicycle, a motorcycle, a truck, a bus, a train, another mobile vehicle, an in-vehicle device with a communication function, or the like in an ITS) receives the message.

In this regard, in the present disclosure, an example of a mechanism capable of further improving certainty of security assurance, particularly, by using the cellular system is proposed as an example of a mechanism capable of applying a cellular system to a transportation system such as an ITS in a more preferable manner.

«3. Configuration Example»
<3.1. Communication System>

First, an overall configuration of a communication system according to the present embodiment will be described with reference to FIGS. 3 to 4.

Figure 3:
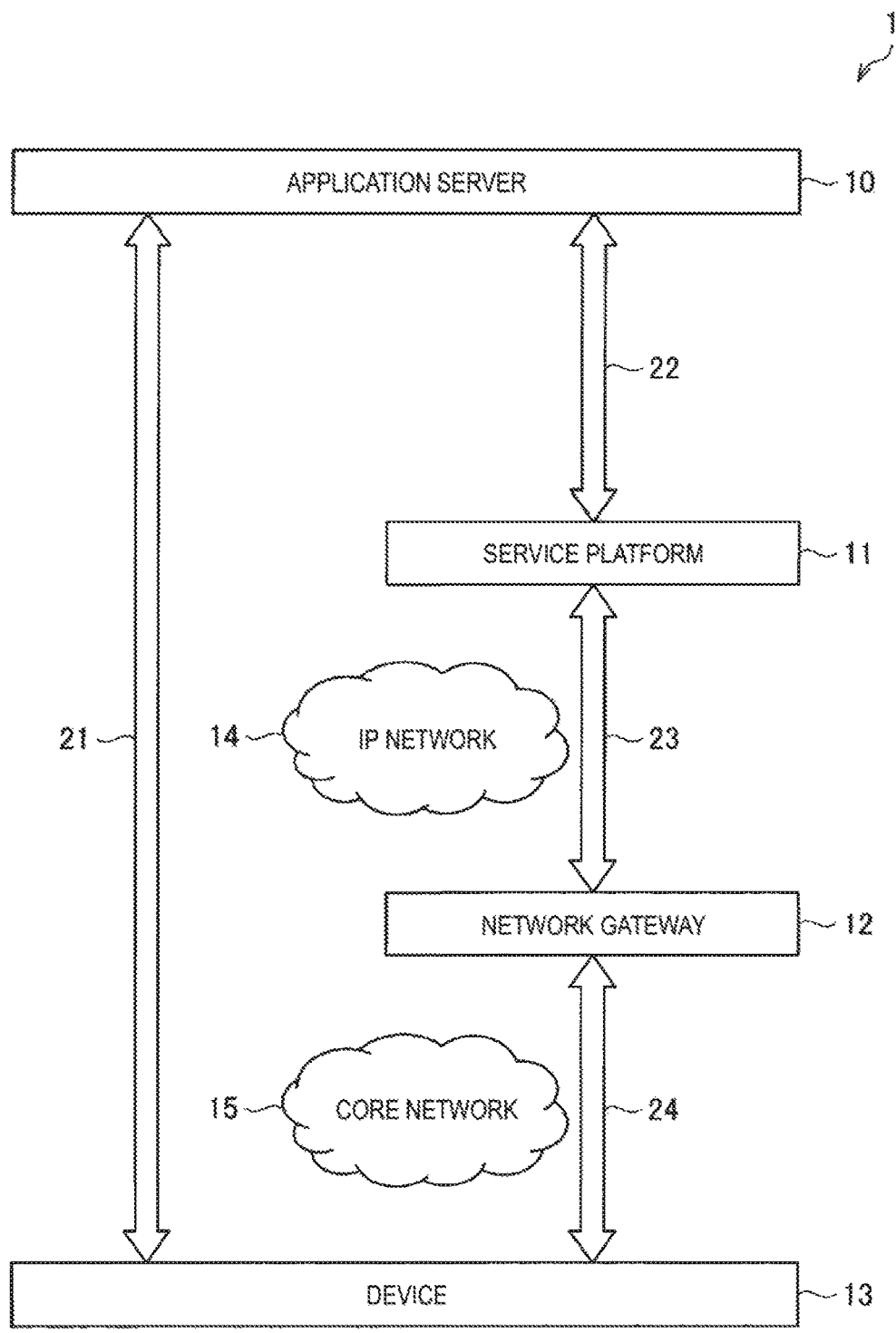
FIG. 3 is a diagram for describing an example of a configuration of a communication system according to one embodiment of the present disclosure.

FIG. 3 is a diagram for describing an example of a configuration of a communication system according to the present embodiment. As illustrated in FIG. 3, a communication system 1 includes an application server 10, a service platform 11, a network gateway 12, a device 13, an IP network 14, and a core network 15.

The application server 10 is a server that provides a service. The service platform 11 is a server that provides an environment serving as the basis of the service provided by the application server 10. The network gateway 12 is a device having a function of relaying between different networks. The device 13 is a wireless communication device. The network gateway 12 is connected to the service platform 11 via the IP network 14. Further, the device 13 is connected to the network gateway 12 via the core network 15.

The device 13 may include a terminal device, a base station, a network manager, or the like The terminal device is, for example, a user terminal. The base station is, for example, a Node B, an eNB, or an access point. The network manager has a function of managing a network. In FIG. 3, the terminal device, the base station, and the network manager are expressed as the device 13 by the same layer, but they may belong to different layers. In a case in which they belong to different layers, it is preferable that the layer to which the base station and the network manager belong be closer to the core network 15 than the layer to which the terminal device belongs.

The terminal device belonging to the device 13 uses the service provided by the application server 10 via the network. A logical session related to the use of such a service can be regarded as communication between the terminal device and the application server 10 indicated by reference numeral 21. Meanwhile, as indicated by reference numerals 22, 23, and 24, physical sessions related to the use of such services can be regarded as communication via various devices. For example, the terminal device is connected to the application server 10 via the base station, the core network 15, the network gateway 12, the IP network 14, and the service platform 11. Further, the application server 10 may form the service platform 11 together with a plurality of other servers such as, for example, a cloud system. In this case, the service platform 11 may have a gateway function of establishing a connection with the IP network 14. Further, the service platform 11, the IP network 14, and the core network 15 may further include, as a physical device, a router, a switch, a virtualizing device of virtualizing a network such as a router or a switch, a virtualization control device of controlling virtualization, a cable, or the like.

Figure 4:
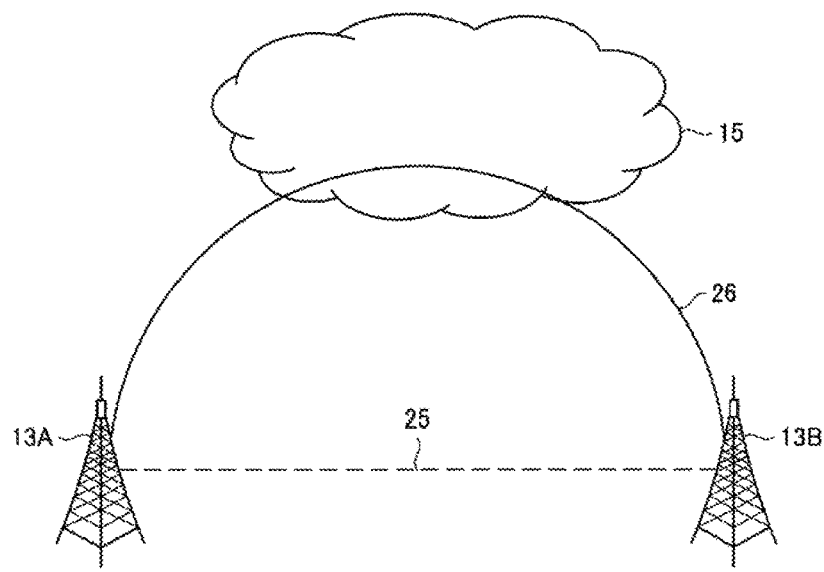
FIG. 4 is a diagram for describing a logical interface and a physical interface.

FIG. 4 is a diagram for describing a logical interface and a physical interface. As illustrated in FIG. 4, base stations 13A and 13B are connected via a logical interface 25. The interface is not necessarily physically connected. For example, as illustrated in FIG. 4, the base stations 13A and 13B may be physically connected via a physical interface 26 through a plurality of entities such as the core network 15. Further, the interfaces between the base stations indicated by reference numerals 25 and 26 are also referred to as an X2 interface. Further, the CBE 410, the CBC 430, and the MME 450 described above with reference to FIG. 1 and FIG. 2 correspond to an example of various kinds of entities (so-called logical entities).

The overall structure of the communication system 1 according to the present embodiment has been described above. Next, a basic configuration example of each of the devices included in communication system 1 will be described.

<3.2. Communication Control Device>

The communication system 1 according to the present embodiment includes a communication control device that controls a communication in the communication system 1 in a coordinated manner. The communication control device can be implemented as, for example, the application server 10, the service platform 11, or a network manager 16. The communication control device may be implemented as a logical entity, and, for example, the communication control device may be formed integrally with the base station. As a more specific example, the communication control device may be implemented as the CBE 410, the CBC 430, or the MME 450 described above with reference to FIGS. 1 and 2.

Figure 5:
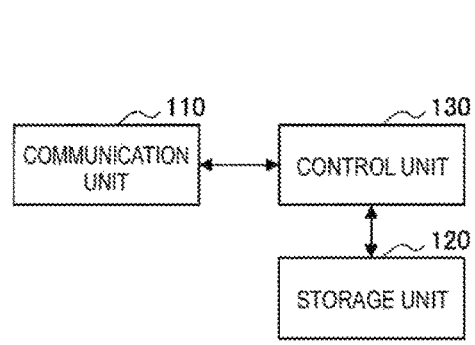
FIG. 5 is a block diagram illustrating an example of a logical configuration of a communication control device according to the embodiment.

FIG. 5 is a block diagram illustrating an example of a logical configuration of a communication control device 100 according to the present embodiment. As illustrated in FIG. 5, the communication control device 100 includes a communication unit 110, a storage unit 120, and a control unit 130.

(1) Communication Unit 110

The communication unit 110 is a communication interface of replaying communication between the communication control device 100 and other devices. The communication unit 110 may be a wired communication interface or a wireless communication interface. As a specific example, the communication unit 110 may perform communication with the wireless communication device of the communication system 1 which is capable of performing communication using a plurality of access schemes including at least one of a multiple access scheme using orthogonal resources and a multiple access scheme using non-orthogonal resources. Examples of the wireless communication device with which the communication unit 110 communicates include one or more terminal devices and one or more base stations belonging to the device 13.

Further, examples of the orthogonal resources include a time (a subframe, a slot, a radio frame, or the like), a frequency (a component carrier, a subcarrier, a subchannel, a resource block, or the like), and a code (a spread code, a randomized code, or the like). Further, examples of the non-orthogonal resources include a space (a spatial stream, a spatial layer, a spatial codebook, an antenna, an antenna port, or the like), power (power or the like), an interleaver (a bit interleaver, a symbol interleaver, or the like), a data rate, and a code (a sparse code, a spreading codebook, or the like). In the following description, the resources are referred to simply as resources, but other names may be used variously. For example, the resources may be referred to as radio access resources (RAR), radio resources (RR), access resources (AR), a radio access axis (RAA), a radio access component (RAC), or a radio access block (RAB).

(2) Storage unit 120

The storage unit 120 stores programs and data for an operation of the communication control device 100 using a storage medium such as a hard disk or a semiconductor memory.

(3) Control Unit 130

The control unit 130 controls an overall operation of the communication control device 100. The control unit 130 has a function of controlling the communication in the communication system 1 in a coordinated manner.

For example, in a case in which the communication control device 100 is implemented as the CBE 410, the control unit 130 may request the CBC 430 to deliver a message such as earthquake information or a tsunami alert (that is, transmits an information delivery request). Further, at this time, the control unit 130 may limit the delivery target of the message on the basis of predetermined conditions.

Further, as another example, in a case in which the communication control device 100 is implemented as the CBC 430, the control unit 130 may generate a delivery message in response to a request from the CBE 410. At this time, the control unit 130 may associate information related to a response destination of the delivery message with the generated delivery message. An example of the response destination of the delivery message includes the CBE 410 which is the delivery source of the delivery message. Further, as the response destination of the delivery message, a configuration different from the delivery source of the delivery message (that is, the CBE 410) such as a server that collects the responses to the delivery messages may be provided. An example of the information related to the response destination of the delivery message includes information (for example, an address) used for the CBC 430 to access the CBE 410. Further, another example of the information related to the response destination of the delivery message includes information (for example, a URL, or the like) used for an end user to directly access the response destination. Further, various operations according to the information related to the response destination will be described later in detail.

Further, the control unit 130 may specify a delivery area in accordance with the delivery target of the generated delivery message and control the communication unit 110 such that the delivery request is transmitted to the MME 450 that manages the specified delivery area. Further, in a case in which the response to the delivery request is received from the MME 450, the control unit 130 transmits a response to so the information delivery request to the CBE 410 which is the transmission source of the information delivery request but may control the communication unit 110 such that the response (that is, the information delivery response) is transmitted.

Further, as another example, in a case in which the communication control device 100 is implemented as the MME 450, if the delivery request is received from the CBC 430, the control unit 130 may control the communication unit 110 such that a response indicating that the message is delivered is transmitted to the CBC 430. Further, the control unit 130 may check the base station 200 located in the area serving as the delivery target of the message from among the base station 200 subordinate thereto and control the communication unit 110 such that the delivery request is transmitted to the corresponding base station 200.

<3.3. Base Station>

Figure 6:
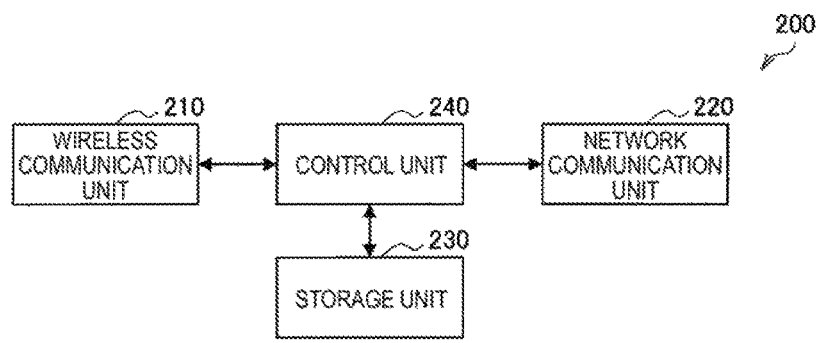
FIG. 6 is a block diagram illustrating an example of a logical configuration of a base station according to the embodiment.

FIG. 6 is a block diagram illustrating an example of a logical configuration of the base station 200 according to the present embodiment. As illustrated in FIG. 6, the base station 200 includes a wireless communication unit 210, a network communication unit 220, a storage unit 230, and a control unit 240.

(1) Wireless Communication Unit 210

The wireless communication unit 210 is a communication interface that mediates communication with another device by the base station 200. The wireless communication unit 210 performs wireless communication with one or more terminal devices 300 connected to the base station 200 using an access scheme such as a multiple access scheme using orthogonal resources or a multiple access scheme using non-orthogonal resources. For example, the wireless communication unit 210 performs wireless communication with the terminal device 300 using a connection setting allocated by the communication control device 100.

(2) Network Communication Unit 220

The network communication unit 220 is a communication interface for connecting the base station 200 to the core network 15. The network communication unit 220 may be a wired communication interface or a wireless communication interface. The network communication unit 220 performs transmission and reception of data traffic and exchange of control messages with various control nodes in the core network 15. The network communication unit 220 can communicate with another base station 200 or the communication control device 100 in the communication system 1.

(3) Storage Unit 230

The storage unit 230 stores programs and data for an operation of the base station 200 using a storage medium such as a hard disk or a semiconductor memory.

(4) Control Unit 240

The control unit 240 controls an overall operation of the base station 200). The control unit 240 according to the present embodiment has a function of controlling the wireless communication unit 210 such that the wireless communication unit 210 performs wireless communication using resources allocated for the access scheme used by the wireless communication unit 210. For example, the control unit 240 sets the wireless communication unit 210 to use the access scheme allocated by the communication control device 100. Further, the control unit 240 sets the wireless communication unit 210 to perform wireless communication using a space region, a power region, an interleaver region, a data rate region, or a sparse code region allocated by the communication control device 100 for the access scheme used by the wireless communication unit 210.

The control unit 240 may receive the message delivery request from the MME 450 and control the wireless communication unit 210 such that the message is delivered to the target terminal device 300. At this time, the control unit 240 may transmit, for example, the paging signal to the terminal device 300 to give a notification indicating that the message is delivered on the basis of the provisions of the ETWS or the like to the terminal device 300 and then deliver the message to the terminal device 300 as the report information. Further, the control unit 240 may limit the message delivery area (in other words, a sector or a cell). Further, in a case in which the message is transmitted to the terminal device 300, the control unit 240 may control the wireless communication unit 210 such that the response is transmitted in response to the message delivery request from the MME 450.

<3.4. Terminal Device>

Figure 7:
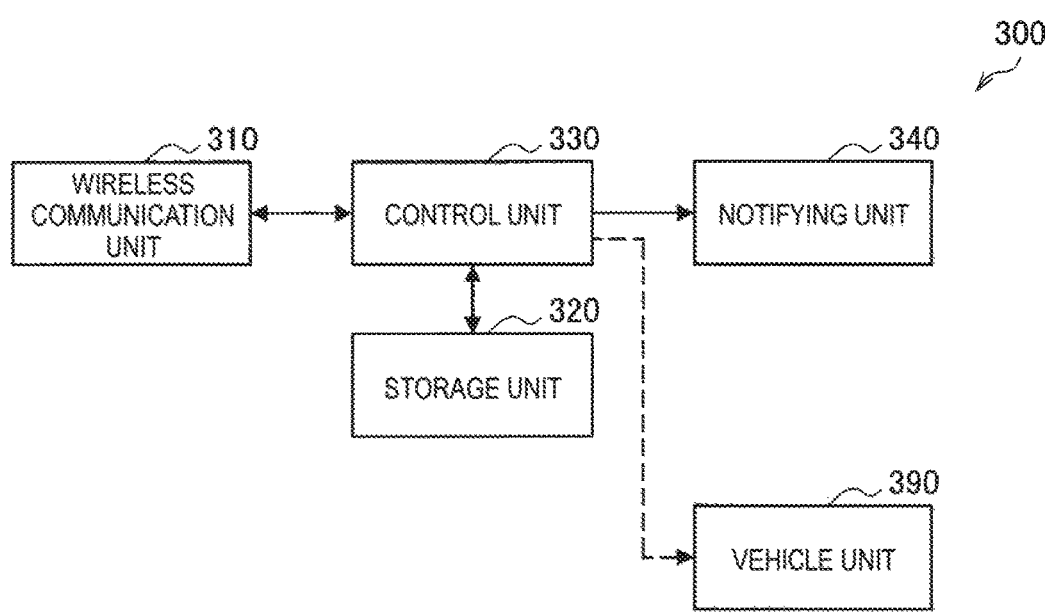
FIG. 7 is a block diagram illustrating an example of a logical configuration so of a terminal device according to the embodiment.

FIG. 7 is a block diagram illustrating an example of a logical configuration of the terminal device 300 according to the present embodiment. As illustrated in FIG. 7, the terminal device 300 has a wireless communication unit 310, a storage unit 320, and a control unit 330. Further, the terminal device 300 may include a notifying unit 340. Further, the terminal device 300 may include a vehicle unit 390.

(1) Wireless Communication Unit 310

The wireless communication unit 310 is a wireless communication interface that relays the wireless communication between the terminal device 300 and other devices. The wireless communication unit 310 according to the present embodiment performs wireless communication using one or more of at least one of a multiple access scheme using orthogonal resources or a multiple access scheme using non-orthogonal resources. For example, the wireless communication unit 310 performs wireless communication with the base station 200 using the connection setting allocated by the communication control device 100.

(2) Storage Unit 320

The storage unit 320 stores programs and data for an operation of the terminal device 300 using a storage medium such as a hard disk or a semiconductor memory.

(3) Notifying Unit 340

The notifying unit 340 reports information to the user using an output device such as a display, a speaker, a vibration device, or the like. For example, the notifying unit 340 may report the report information corresponding to content of the message delivered from the base station 200 to the user.

(4) Vehicle Unit 390

The vehicle unit 390 schematically indicates various kinds of configurations (for example, a drive system and the like) and functions (for example, a security lock and the like) of a vehicle device such as an automobile or a train. An operation of the vehicle unit 390 may be directly or indirectly controlled by, for example, the control unit 330 to be described later. As a more specific example, there is an example of automatic driving of an automobile. In this case, for example, the vehicle unit 390 may control the configurations and functions of the drive system (for example, the accelerator and the brake) on the basis of instructions from the control unit 330.

Further, the terminal device 300 including the vehicle unit 390 may correspond to a vehicle device such as a so-called automobile or train having a communication function with the base station 200. Further, the vehicle unit 390 may be installed outside the terminal device 300. In this case, the terminal device 300 may correspond to a so-called in-vehicle device installed in the vehicle device.

(5) Control Unit 330

The control unit 330 controls an overall operation of the terminal device 300. The control unit 330 according to the present embodiment has a function of controlling the wireless communication unit 310 such that the wireless communication unit 310 performs wireless communication using resources allocated for the access scheme used by the wireless communication unit 310. For example, the control unit 330 sets the wireless communication unit 310 to use the access scheme allocated by the base station 200. Further, the control unit 330 sets the wireless communication unit 310 to perform wireless communication using a space region, a power region, an interleaver region, a data rate region, or a sparse code region allocated by the base station 200 for the access scheme used by the wireless communication unit 310.

In a case in which the message is delivered from the base station 200, the control unit 330 may cause the notifying unit 340 to report the report information corresponding to content of the message. Further, the control unit 330 may directly or indirectly control an operation of the vehicle unit 390 in accordance with the content of the message delivered from the base station 200.

Further, in a case in which the message is delivered from the base station 200, the control unit 330 may execute a process of transmitting a response indicating that the message has been delivered to the response destination of the message. Further, this process will be described later in detail.

The basic configuration example of each of the devices included in the communication system 1 has been described above with reference to FIGS. 3 to 7.

«4. Technical Features»

Next, technical features according to one embodiment of the present disclosure will be described.

<4.1. Example of Message Delivery Flow>

First, an example of a message delivery flow in the communication system 1 according to one embodiment of the present disclosure will be described, particularly, assuming the application to the transportation system.

For example, as a type of a message of information related to traffic (hereinafter also referred to as "safety information"), the following examples are considered:

1. a message corresponding to a specific vehicle (recall information or the like of a specific vehicle):
2. a message widely corresponding to a vehicle (road traffic information, public transportation information, peripheral information, or the like); and
3. a message corresponding to a specific driver (vehicle inspection information, insurance information, recommendation information, or the like).

For the message corresponding to the specific vehicle, a case in which there are a plurality of delivery targets is assumed, but for example, the message can be assumed to be delivered through multicast or broadcast. Further, for the message widely corresponding to the vehicle, a case in which the delivery target is not particularly limited is assumed, but for example, it is preferable since it is efficient to deliver the message through broadcast. Further, for the message corresponding to the specific driver, it is preferable to deliver the message through unicast from a viewpoint of privacy.

Further, in the case of delivering the message through unicast, the delivery method is similar to the delivery method in the cellular system according to the related art. For this reason, the description will mainly proceed with an example of a delivery flow in a case in which the message is delivered through multicast and broadcast, and detailed description of the message delivery through unicast is omitted.

(Example in Case of Multicast)

Figure 8:
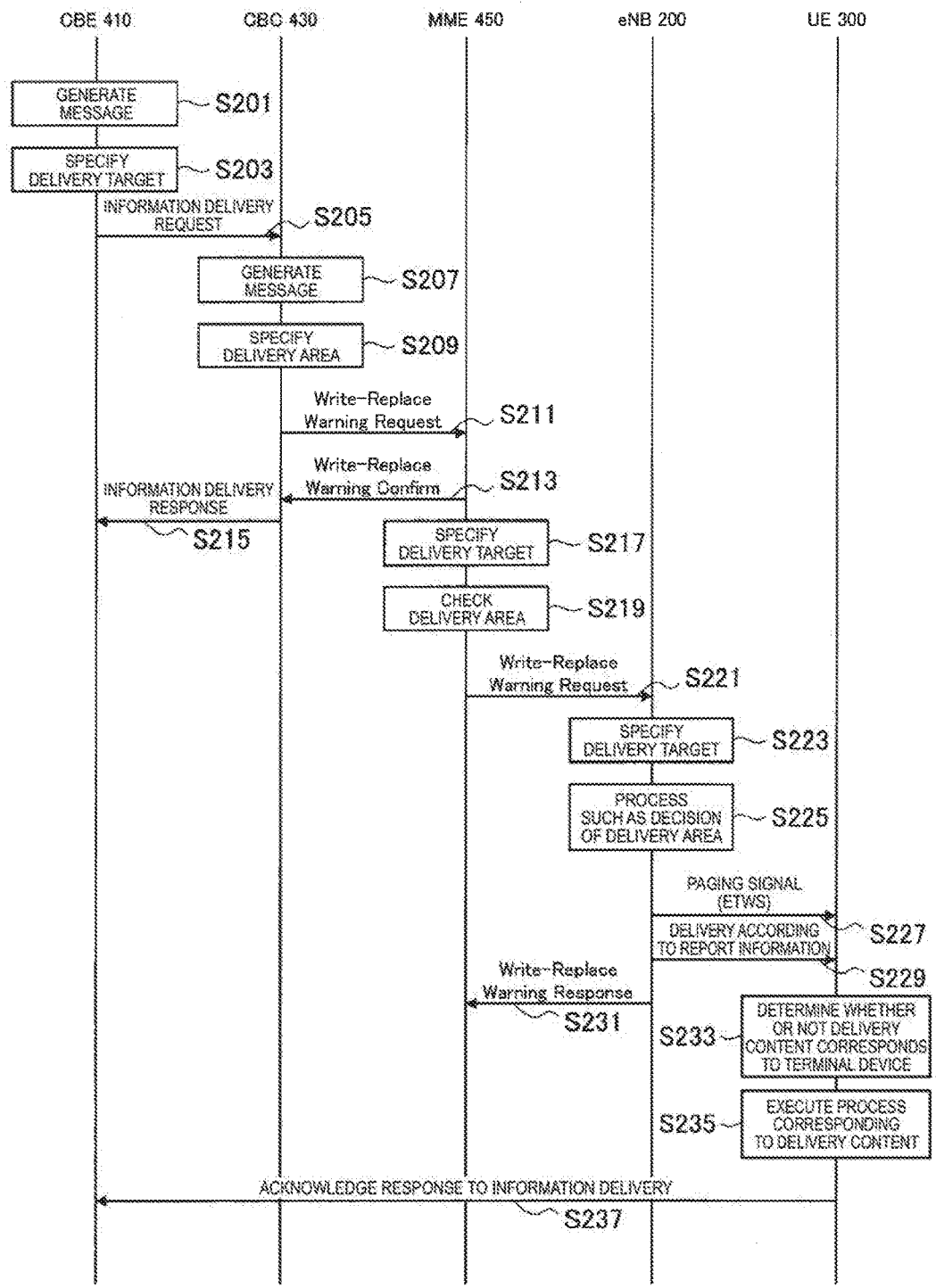
FIG. 8 is a sequence diagram illustrating an example of a process flow related to delivery of a message using multicast.

First, an example of a process flow related to delivery of a message such as safety information using multicast will be described with reference to FIG. 8. FIG. 8 is a sequence diagram illustrating an example of a process flow related to delivery of a message using multicast. Further, in this description, using a case in which information related to a specific vehicle (for example, the recall information or the like) is delivered as a message as an example, an example of a delivery flow of the message will be described. In other words, in this description, the CBE 410 corresponds to a vehicle manufacturer such as an automobile manufacturer or a bicycle manufacturer, a vehicle dealership, a management company that manages vehicles, and the like.

Firstly, in a case in which the necessity (an event or the like) of message delivery occurs (S201), the CBE 410 specifies the delivery target of the message on the basis of a predetermined condition (for example, a vehicle model of a recall target) (S203). Further, at this time, the CBE 410 may set a type of message (for example, the recall information, or the like) in accordance with content of the message to be delivered. Further, the CBE 410 may set information indicating a transmission destination (that is, the response destination) of the response to the message to be delivered. Further, the CBE 410 may set information related to the CBE 410, for example, the information indicating the response destination or may set information indicating a response destination set separately from the CBE 410. Further, an example of a more detailed operation related to the specifying of the delivery target of the message by the CBE 410 will be described later. Then, the CBE 410 transmits the information delivery request related to the delivery of the message to the CBC 430 (S205).

Upon receiving the information delivery request from the CBE 410, the CBC 430 generates a message according to content of the request, and associates the information related to the response destination of the information delivery request with the message in response to the request from the CBE 410 (S207). Then, the CBC 430 specifies the area to which the message is delivered (S209) in accordance with the delivery target of the generated message (for example, a vehicle model or a vehicle or a terminal device corresponding to the vehicle model). Then, the CBC 430 transmits the delivery request (for example, Write-Replace Warning Request) to the MME 450 that manages the specified area (S211). Further, an example of a more detailed operation of the CBC 430 will be described later.

Upon receiving the delivery request from the CBC 430, the MME 450 transmits the response (for example, Write-Replace Warning Confirm) indicating the delivery of the message to the CBC 430 (S213). Upon receiving the response to the delivery request from the MME 450, the CBC 430 transmits the information delivery response indicating that the information delivery request is responded to the CBE 410 which is the transmission source of the information delivery request (S215).

Then, the MME 450 checks the base station 200 located in the area serving as the delivery target of the message from the base station (eNB) 200 subordinate thereto (S219). At this time, the MME 450 may specify the delivery target of the message on the basis of a predetermined condition such as a target vehicle model (S217) and then check the base station 200 located in the area serving as the delivery target of the message on the basis of a result of specifying the delivery target (S219). Then, the MME 450 transmits the delivery request (for example, Write-Replace Warning Request) to the base station 200 (S221). Further, an example of a more detailed operation of the MME 450 will be described later.

Upon receiving the delivery request from the MME 450, the base station 200 executes a process of transmitting the message to the terminal device (UE) 300 serving as the delivery target as the report information. Specifically, the base station 200 decides the delivery area in a case in which there are a plurality of sectors or cells subordinate to the base station 200 (S225). Further, at this time, the base station 200 may specify the terminal device 300 serving as the delivery target of the message on the basis of a predetermined condition such as a target vehicle model (S223) and then decide the delivery area on the basis of the result of specifying the delivery target (S225). Then, the base station 200 transmits the paging signal to the terminal device 300 to gives a notification indicating that the message is delivered to the terminal device 300 (S227) and delivers the message to the terminal device 300 as the report information (S229). Further, in a case in which the transmission of the message to the terminal device 300 is completed, the base station 200 transmits the response (for example, Write-Replace Warning Confirm) to the MME 450 (S231). Further, an example of a more detailed operation of the base station 200 will be described later.

Upon receiving the message from the base station 200 as the report information, the terminal device 300 decides whether or not the content of the message corresponds to the terminal device 300 (S233). For example, the terminal device 300 may determine whether or not the content of the message corresponds to the terminal device 300 depending on whether or not the vehicle model of the vehicle associated with the terminal device 300 corresponds to the vehicle model indicated as a target by the content of the delivered message. Then, in a case in which the content of the message is determined to correspond to the terminal device 300, the terminal device 300 executes a process corresponding to the content of the message (S235). As a specific example, the terminal device 300 may report the report information corresponding to the content of the message to the user through a predetermined output unit (for example, a display, a speaker, or the like). Further, as another example, the terminal device 300 may control an operation of the vehicle (for example, the accelerator, the brake, or the like) in accordance with the content of the message.

Further, the terminal device 300 executes a process of transmitting a response corresponding to the message (hereinafter also referred to as an "acknowledgment response") to the response destination on the basis of information related to the response destination of the message (for example, CBE 410 or the like) associated with the delivered message (S237).

For example, in a case in which an address for accessing the response destination (for example, the CBE 410) is associated with the message, the terminal device 300 generates the acknowledgment response to the delivered message, associates the address with the acknowledgment response, and transmits the resulting acknowledgment response to the base station 200. Accordingly, the acknowledgment response transmitted from the terminal device 300 pass through the base station 200 and the MME 430 sequentially and then is received by the CBC 430. Further, the CBC 430 accesses the target response destination (for example, the CBE 410) on the basis of the address associated with the received acknowledgment response, and transmits the received acknowledgment response to the response destination. Accordingly, an entity that manages the response of the message delivered from the CBE 410 (for example, the CBE 410, the server which collects the response, or the like) is able to check that the message on which the information delivery request has been made has arrived at the terminal device 300 serving as the delivery target.

Further, as another example, in a case in which information (for example, a URL, or the like) used for the user to directly access the response destination (for example, the CBE 410) is associated with the message, the terminal device 300 may present an interface in which the user can perform the acknowledgment response to the message on the information. As a more specific example, the terminal device 300 may activate a browser or the like and present a screen for accessing a web page of the response destination via a network such as the Internet. Further, at this time, the terminal device 300 may present an interface (for example, a button, or the like) for transmitting the acknowledgment response to the delivered message via the network. In this case, for example, the terminal device 300 receives a user manipulation on the presented screen and transmits the acknowledgment response to the message to the response destination of the message (for example, the CBE 410) via the network such as the Internet. With such a configuration, the CBE 410 can check that the message on which the information delivery request has been made has arrived at the terminal device 300 serving as the delivery target.

Further, an example of a more detailed operation of the terminal device 300 will be described later.

The example of the process flow related to the delivery of the message such as the safety information using multicast has been described above with reference to FIG. 8. Further, the process related to the specifying of the delivery target which has been described as the process of the CBE 410, the CBC 430, the MME 450, and the base station 200 may not necessarily be executed in all the components as long as so the process is executed in at least some of the components.

(Example in Case of Broadcast)

Figure 9:
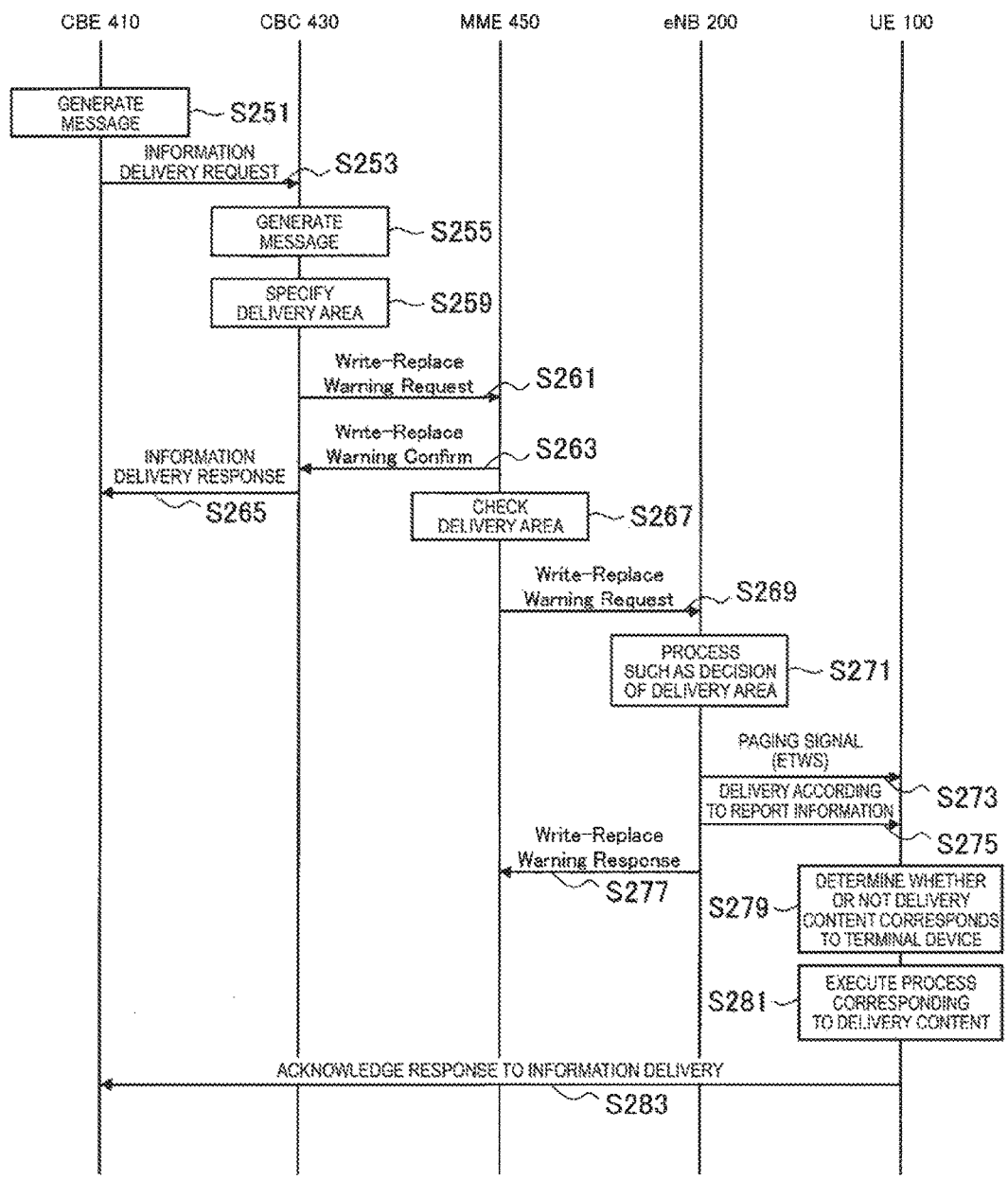
FIG. 9 is a sequence diagram illustrating an example of a process flow related to delivery of a message using broadcast.

Next, an example of a process flow related to delivery of the message such as the safety information using broadcast will be described with reference to FIG. 9. FIG. 9 is a sequence diagram illustrating an example of a process flow related to delivery of a message using broadcast.

As illustrated in FIG. 9, in a case in which message is delivered using broadcast, in the example illustrated in FIG. 8 (that is, in the example using multicast), the CBE 410, the CBC 430, the MME 450, and the base station 200, it is unnecessary to perform the process (for example, the processes illustrated as S203, S217, and S223 in FIG. 8) related to the delivery target. Further, since the other processes are similar to those described with reference to FIG. 8, the detailed description will be omitted.

Further, in the communication system 1 according to the present embodiment, for example, the message delivery method may be selectively switched between multicast and broadcast depending on whether or not the delivery target can be specified. In this case, for example, the configurations of the CBE 410, the CBC 430, the MME 450, the base station 200 and the like may be operated to use multicast in a case in which the delivery target can be specified and to use broadcast in a case in which the delivery target is unable to be specified.

The example of the process flow related to the delivery of the message such as the safety information using broadcast has been described above with reference to FIG. 9.

<4.2. Specifying of Delivery Target by CBE>

Figure 10:
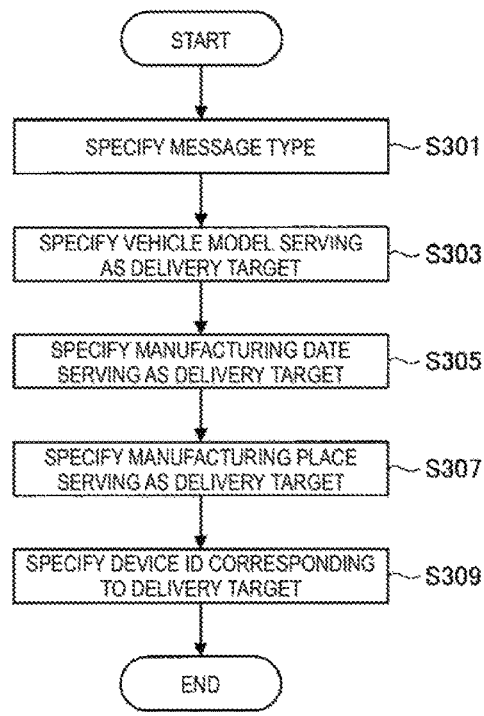
FIG. 10 is a flowchart illustrating an example of a process related to specifying of a delivery target of a message by a CBE.

Next, an example of a process related to the specifying of the delivery target of the message by the CBE 410 will be described with reference to FIG. 10, particularly, using a case in which the safety information such as the recall information of a specific vehicle is delivered as an example. FIG. 10 is a flowchart illustrating an example of a process related to the specifying of the delivery target of the message by the CBE 410.

Specifically, in a case in which the necessity of message delivery occurs, the CBE 410 first specifies a message type of a message to be delivered (S301). Here, the message type is information indicating a type of message to be delivered, and for example, in a case in which the recall information is delivered as the message, a message type indicating that the message is the recall information is set.

Then, the CBE 410 specifies the delivery target in accordance with the content of the message to be delivered (S303 to S307). As a specific example, in a case in which the content of the message to be delivered depends on the vehicle model, the CBE 410 specifies a vehicle model serving as the delivery target (S303). Further, in a case in which the content of the message to be delivered depends on a manufacturing date of a vehicle, the CBE 410 specifies a manufacturing date serving as the delivery target (S303). Further, in a case in which the content of the message to be delivered depends on a manufacturing place of a vehicle, the CBE 410 specifies a manufacturing place serving as the delivery target (S303). As described above, the CBE 410 may specify the delivery target of the message in accordance with various kinds of conditions such as the vehicle model, manufacturing date, a manufacturing place, and the like.

Then, the CBE 410 specifies the terminal device 300 corresponding to the condition specified as the delivery target (S309). Further, at this time, the CBE 410 may recognize the terminal device 300 corresponding to the vehicle model specified as the delivery target on the basis of a management table indicating a correspondence relation between the vehicle model and the terminal device 300 which is generated in advance. For example, Table 1 shown below indicates an example of the management table indicating the correspondence relation between the vehicle model so and the terminal device 300.

TABLE 1

Management table in which device ID and vehicle model ID are associated

| Device ID (IMSI, TMSI, or the like) | Vehicle model ID |
|---|---|
| AAAAAA | xxxxxx |
| BBBBBB | yyyyyy |
| CCCCCC | zzzzzz |
| . . . | . . . |

In Table 1, the vehicle model JD is identification information identifying the vehicle model. Further, the device ID is identification information identifying the terminal device 300. Further, a specific example of the device ID includes identification information identifying the user within the cellular system such as international mobile subscriber identity (IMSI), temporary mobile subscriber identity (TMSI), or the like.

Further, a main entity of the process of specifying the terminal device 300 corresponding to the vehicle model serving as the delivery target on the basis of the management table shown in Table 1 is not necessarily limited to the CBE 410

As a specific example, at least one of the CBC 430, the MME 450, and the base station 200 may hold the management table shown in Table 1 and may specify the terminal device 300 corresponding to the vehicle model serving as the delivery target on the basis of the management table.

Then, the CBE 410 generates information elements (IEs) for requesting the delivery of the message on the basis of the result of specifying the delivery target, and transmits the generated IEs to the CBC 430 as the information delivery request. For example, Table 2 shown below indicates an example of a data structure of an IE for the information delivery request.

TABLE 2

Example of information elements for information delivery request Information Elements Message ID
(information delivery request, information delivery response, or the like)
Message Series
(numbering for sorting order in a case in which it becomes one piece of information by a plurality of deliveries)
Message Type ID
(recall or the like)
Emergency Level ID
(urgent, normal, or the like)
Distribution    Distribution Type ID
               (multicast, broadcast, unicast, or the like)
               Distribution Subscriber IDs
               (device ID, IMSI, TMSI, or the like)
               Reserve Field TABLE 2-continued Example of information elements for information delivery request Information Elements Options    Message Text
         (body of message)
         Source URL/Source Address
         (information indicating delivery source of message)
         Response URL/Response Address
         (information for accessing response destination of message)
         Response Requirements
         (action required in device that performs reception)
         Vehicle ID
         (vehicle model ID of delivery target)
         Reserve Field
Reserve Field In Table 2, "Message ID" is identification information identifying a type of each IE, and for example, identification information indicating that the IE is the "information delivery request," identification information indicating the response to the information delivery request (hereinafter also referred to as an "information delivery response"), or the like is set. Further, "Message Series" is information for sorting an order of information transmitted by each delivery in a case in which IEs are divided into a plurality of deliveries and transmitted. Further, "Message Type ID" is information indicating a type of message, and for example, identification information indicating that the message to be delivered is the "recall information" or the like is set. "Emergency Level ID" is information indicating a degree of urgency, and for example, information indicating "urgent," "normal," or the like is set.

"Distribution" is information indicating a setting related to the delivery of the message, and "Distribution Type ID," "Distribution Subscriber IDs," or the like are set. "Distribution Type ID" is information indicating a delivery type, and information indicating "multicast," "broadcast," "unicast" or the like is set in accordance with the delivery method of the selected message. "Distribution Subscriber IDs" is information corresponding to the terminal device 300 serving as the delivery target, and a device ID such as IMSI, TMSI, or the like is set.

"Options" indicates a so-called extended region, and various kinds of information is set. For example, "Message Text" is information indicating a body of the message to be delivered (for example, character information). Further, information indicating the delivery source of the message such as "Source URL" and "Source Address" may be included. Further, "Source URL" is, for example, information used for the end user to access the web site of the message delivery source. Further, "Source Address" is information used for an entity such as CBC 430 to access the CBE 410 which is the delivery source of the message. Further, information for accessing the response destination of the message such as "Response URL" or "Response Address" may be included. Further, "Response URL" is, for example, information used for the end user to access the web site serving as the response destination in order to perform the response to the message. Further, "Response Address" is information for giving a notification indicating the response to the delivered message from the terminal device 300 to the entity serving as the response destination (for example, the CBE 410, the server that collects the response, or the like) through the base station 200, the MME 450, and the CBC 430. Further, "Response Requirements" is information indicating an action required for a device which performs reception. As a specific example, "Response Requirements" may include information indicating the response to the message, control of a vehicle, and the like. Further, "Vehicle ID" is information indicating the vehicle model serving as the delivery target of the message.

Further, a case in which the delivery source of the message coincides with the response destination of the message such as a case in which the CBE 410 serving as the delivery source of the message collects the responses to the message is considered. In this case, only one of information indicating the delivery source of the message (for example, "Source URL," "Source Address," or the like) and information for accessing the response destination (for example, "Response URL," "Response Address," and the like) may be set. As a specific example, in a case in which only the information indicating the delivery source of the message is set, the information may be used as information for accessing the response destination.

The example of the process related to the specifying of the delivery target of the message by the CBE 410 has been described above with reference to FIG. 10, particularly, using the case in which the safety information such as the recall information of the specific vehicle is delivered as an example.

<4.3. Generation of Message and Specifying of Delivery Target by CBC>

Figure 11:
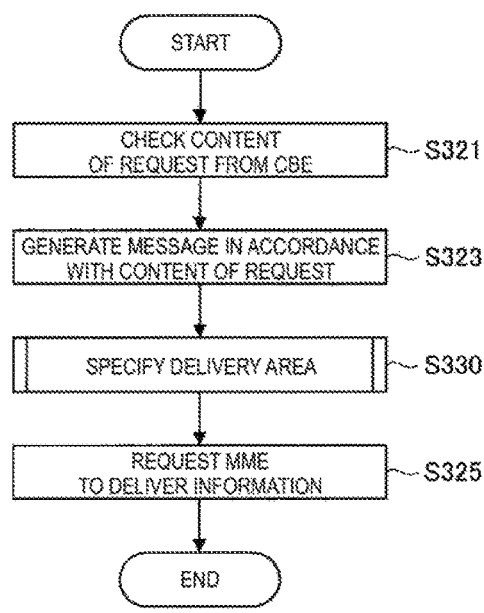
FIG. 11 is a flowchart illustrating an example of a flow of a series of processes related to generation of a message, specifying of a delivery target, and request for information delivery by a CBC.
Figure 12:
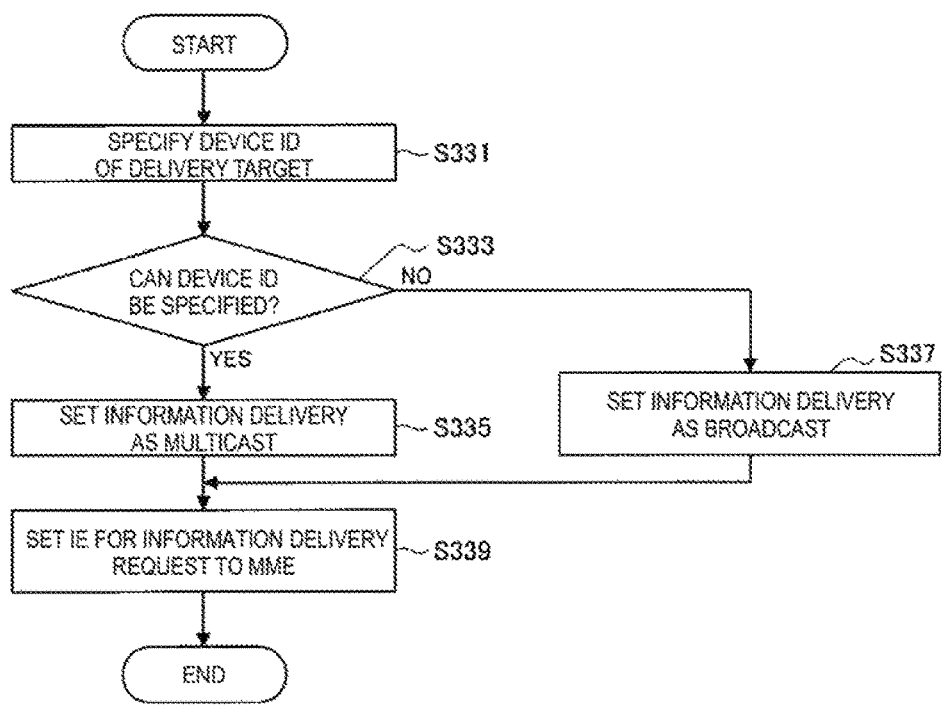
FIG. 12 is a flowchart illustrating an example of a flow of a series of processes related to generation of a message, specifying of a delivery target, and request for information delivery by a CBC.

Next, an example of a flow of a series of processes related to the generation of the message, the specifying of the delivery target, and the request for the information delivery by the CBC 430 will be described with reference to FIG. 11 and FIG. 12. FIGS. 11 and 12 are flowcharts illustrating an example of a flow of a series of processes related to the generation of the message, the specifying of the delivery target, and the request for the information delivery by the CBC 430.

As illustrated in FIG. 11, upon receiving the information delivery request (IE) from the CBE 410, the CBC 430 analyzes content of the received information so delivery request, recognizes the content of the information delivery request (S321), and generates the message in accordance with the recognized request content (S323).

Then, the CBC 430 specifies the delivery area of the generated message (S330). For example, FIG. 12 is a flow chart illustrating an example of a flow of a process related to specifying of the delivery area of the message by the CBC 430.

Specifically, the CBC 430 first attempts to specify the device ID (for example, IMSI, TMSI, or the like) of the terminal device 300 serving as the delivery target (S331). At this time, in a case in which the terminal device 300 serving as the delivery target can be recognized in the layer of the CBC 430 or in a layer higher than the layer of the CBC 430 (for example, the CBE 410), it is possible to specify the device ID of the terminal device 300 at this point.

Here, in a case in which the device ID of the delivery target can be specified (YES in S333), the CBC 430 sets various kinds of information (for example, information indicated by "Distribution" in Table 2 or the like) so that the message is multicast to the specified device ID (S335).

On the other hand, in a case in which the device ID of the delivery target is unable to be specified or in a case in which the device ID is indefinite (NO in S333), the CBC 430 sets various kinds of information (S337) so that the message is broadcasted.

Then, the CBC 430 sets an IE for transmitting the information delivery request to the MME 450 on the basis of the set various kinds of information (S339). Then, as illustrated in FIG. 11, the CBC 430 requests the MME 450 to deliver the message by transmitting the set IE to the MME 450 as the delivery request (S325).

Further, the MME 450 to which the CBC 430 transmits the delivery request may be, for example, all the MMEs 450 in the target cellular system. Particularly, so in a case in which the message is broadcast, it is preferable to transmit the delivery request to all the MMEs 450. On the other hand, in a case in a case in which the message is multicast, and the CBC 430 can recognize the area of the delivery target (for example, the area including the specified device ID) and the MME 450 managing the area, the CBC 430 may transmit the delivery request only to the MME 450 managing the area.

The example of the flow of a series of processes related to the generation of the message, the specifying of the delivery target, and the request for the information delivery by the CBC 430 has been described above with reference to FIGS. 11 and 12.

<4.4. Specifying of Delivery Area by MME>

Figure 13:
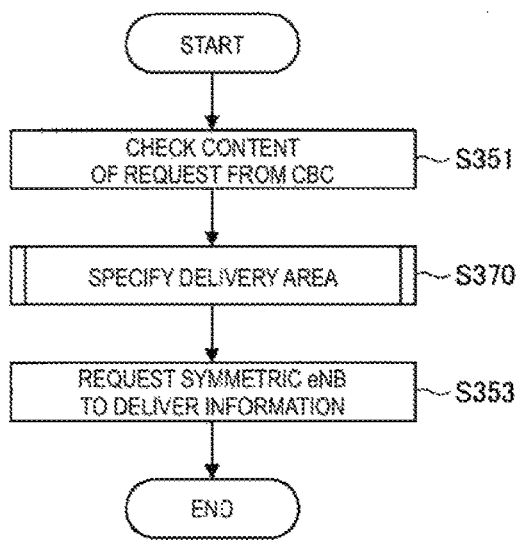
FIG. 13 is a flowchart illustrating an example of a flow of a series of processes related to specifying of a delivery target and request for information delivery by an MME.
Figure 14:
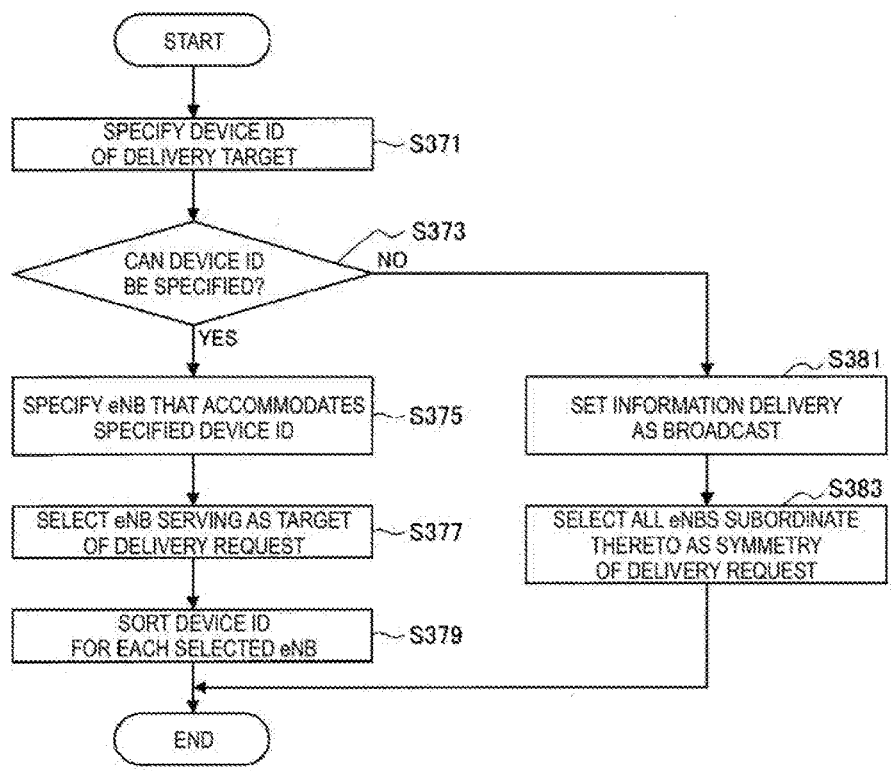
FIG. 14 is a flowchart illustrating an example of a flow of a series of processes related to specifying of a delivery target and request for information delivery by an MME.

Next, an example of a flow of a series of processes related to the specifying of the delivery target and the request for the information delivery by the MME 450 will be described with reference to FIG. 13 and FIG. 14. FIGS. 13 and 14 are flowcharts illustrating an example of a flow of a series of processes related to the specifying of the delivery target and the request for the information delivery by the MME 450.

As illustrated in 13, upon receiving the delivery request (IE) from the CBC 430, the MME 450 analyzes content of the received delivery request, recognizes the content of the delivery request (S321), and sets the delivery area of the message (S370). Further, at this time, the MME 450 may execute a process related to specifying of a device serving as the delivery target by the CBE 410 or the CBC 430 at this stage. For example, FIG. 14 is a flowchart illustrating an example of a flow of a process related to the specifying of the delivery area of the message by the MME 450.

Specifically, the MME 450 first attempts to specify the device ID (for example, IMSI, TMSI, or the like) of the terminal device 300 serving as the delivery target (S371). At this time, in a case in which the terminal device 300 serving as the delivery target can be recognized in the layer of the MME 450 or in a layer higher than the layer of the MME 450 (for example, the CBE 410 or the CBC 430), it is possible to specify the device ID of the terminal device 300 at this point.

In a case in which the device ID of the delivery target can be specified (YES in S333), the MME 450 specifies the base station (eNB) 200 that accommodates the terminal device 300 corresponding to the specified device ID in the cell (S375). Then, the MME 450 selects the specified base station 200 as the transmission destination of the delivery request (that is, the request destination of the message delivery) (S377).

Further, for one information delivery, a case in which there are a plurality of base stations 200 serving as the transmission destination of the delivery request is assumed. Therefore, the MME 450 selects base stations 200 corresponding to all the device IDs specified as the delivery target and lists the base stations 200 serving as the transmission destination of the delivery request. Then, the MME 450 sorts the specified device ID for each of the listed base stations 200 (S379).

On the other hand, in a case in which the device ID of the delivery target is unable to be specified or in a case in which the device ID is indefinite (NO in S381), the MME 450 sets various kinds of information (S381) so that the message is broadcasted. Further, here, the case in which the device ID is indefinite may include a case in which the symmetric terminal device 300 is not located under the MME 450 (that is, the terminal device 300 is located in another area) as well. Then, the MME 450 selects all the base stations 200 subordinate thereto as the transmission destination of the delivery request (S383).

Then, as illustrated in FIG. 13, the MME 450 requests the base station 200 to deliver the message by transmitting the IE for the delivery request to the base station 200 specified as the transmission destination of the delivery request (S353).

The example of the flow of a series of processes related to the specifying of the delivery target and the request for the information delivery by the MME 450 has been described above with reference to FIGS. 13 and 14.

<4.5. Message Delivery by Base Station>

Figure 15:
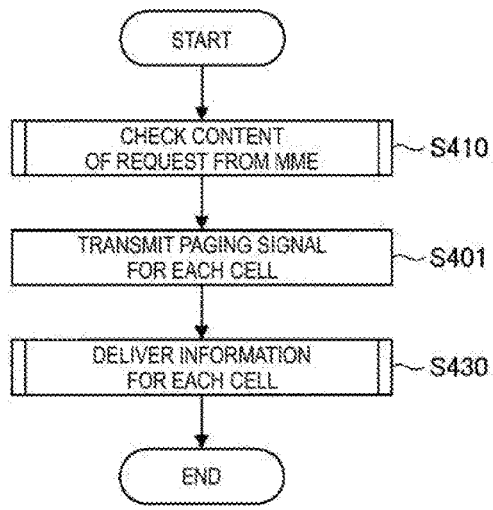
FIG. 15 is a flowchart illustrating an example of a flow of a series of processes related to delivery of a message by a base station.
Figure 16:
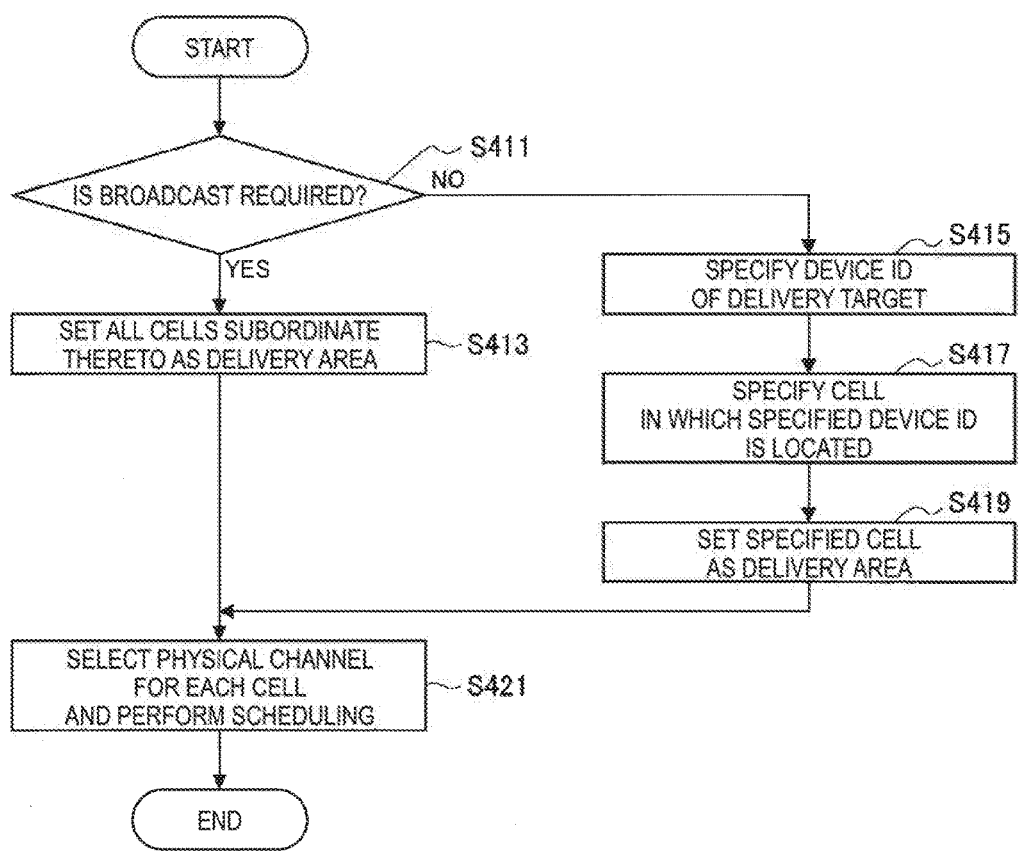
FIG. 16 is a flowchart illustrating an example of a flow of a series of processes related to delivery of a message by a base station.
Figure 17:
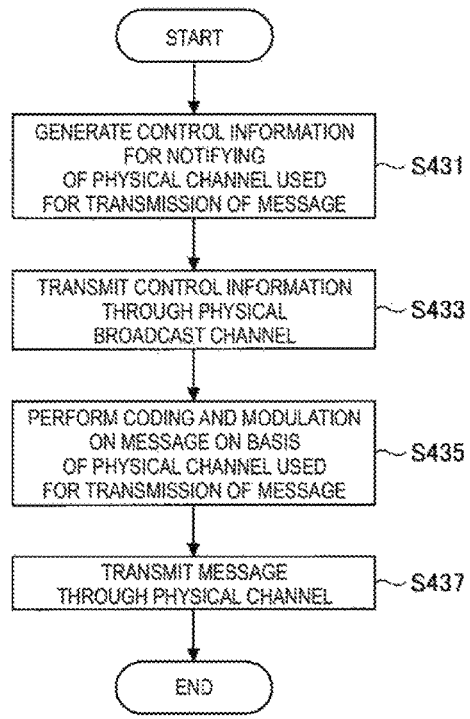
FIG. 17 is a flowchart illustrating an example of a flow of a series of processes related to delivery of a message by a base station.

Next, an example of a flow of a series of processes related to the delivery of the message by the base station (eNB) 200 will be described with reference to FIGS. 15 to 17. FIGS. 15 to 17 are flowcharts illustrating an example of a flow of a series of processes related to the delivery of the message by the base station 200.

As illustrated in FIG. 15, upon receiving the delivery request (IE) from the MME 450, the base station 200 analyzes content of the received delivery request and recognizes the content of the delivery request (S410). For example, FIG. 16 is a flowchart illustrating an example of a flow of a process related to recognition of the content of the delivery request delivered from the MME 450 by the base station 200.

For example, the base station 200 determines whether delivery of the requested message is broadcast or multicast. In a case in which the delivery of the message by broadcast is requested (YES in S411), the base station 200 sets all cells subordinate thereto as the delivery area which is a message delivery target (S413).

On the other hand, in a case in which the delivery of the message by multicast is requested (NO in S411), the base station 200 specifies the device ID as the delivery target of the message on the basis of the received delivery request (that is, the IE) (S415), and specifies a cell in which the terminal device 300 corresponding to the specified device ID is located (S417). Then, the base station 200 sets the specified cell as the delivery area which is the message delivery target (S419). Further, there may be a plurality of cells which are set as the delivery area.

If the cell to be the delivery area is set, the base station 200 selects a channel (that is, a logical channel, a physical channel, a radio resource, or the like) for transmitting the message for each set cell, and performs scheduling such as resource allocation.

Then, as illustrated in FIG. 15, the base station 200 gives a notification indicating that the message is delivered to the terminal device 300 subordinate thereto by transmitting the paging signal in each cell set as the delivery area (S401). Then, after the paging signal is transmitted, the base station 200 delivers the message requested to be delivered (that is, the message corresponding to the delivery request) to the terminal device 300 subordinate to the cell. For example, FIG. 17 is a flowchart illustrating an example of a flow of a process related to the delivery of the message by the base station 200.

Specifically, the base station 200 generates control information (for example, System Information) for giving a notification indicating, for example, the channel or the like selected to deliver the message or the like to the terminal device 300 (S431). For example, the control information (System Information) includes information related to positions of frequency (a component carrier, a resource block, or the like) and time resources (a radio frame, a subframe, a slot, or the like) of the selected channel.

Then, the base station 200 transmits the generated control information to the terminal device (UE) 300 subordinate to the corresponding cell (S433). Further, at this time, the base station 200 may transmit the generated control information using, for example, a physical broadcast channel (PBCH). Then, the base station 200 performs coding and modulation on the message such that the message (IE) is delivered through a channel and resources specified by the control information (S435), and transmits the message which has undergone the coding and modulation to the terminal to the terminal device 300 (S437).

The example of the flow of a series of processes related to the delivery of the message by the base station 200 has been described above with reference to FIGS.

<4.6. Operation of Terminal Device Receiving Delivery of Message>

Next, an example of an operation of the terminal device (UE) 300 that has received the delivery of the message from the base station (eNB) 200 will be described with reference to FIGS. 18 to 27.

(Decision of Process to be Executed)

Figure 18:
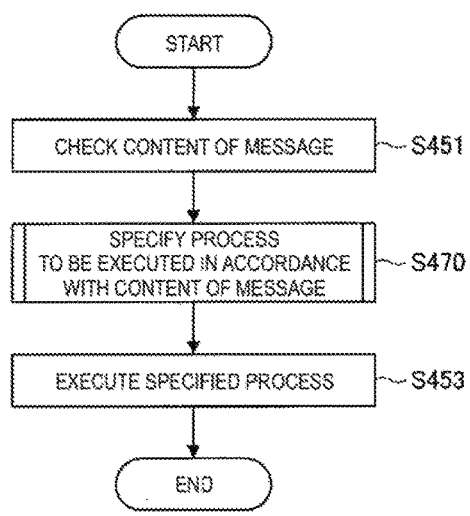
FIG. 18 is a flowchart illustrating an example of a flow of a series of processes related to decision of a process to be executed according to content of a delivered message by a terminal device.
Figure 19:
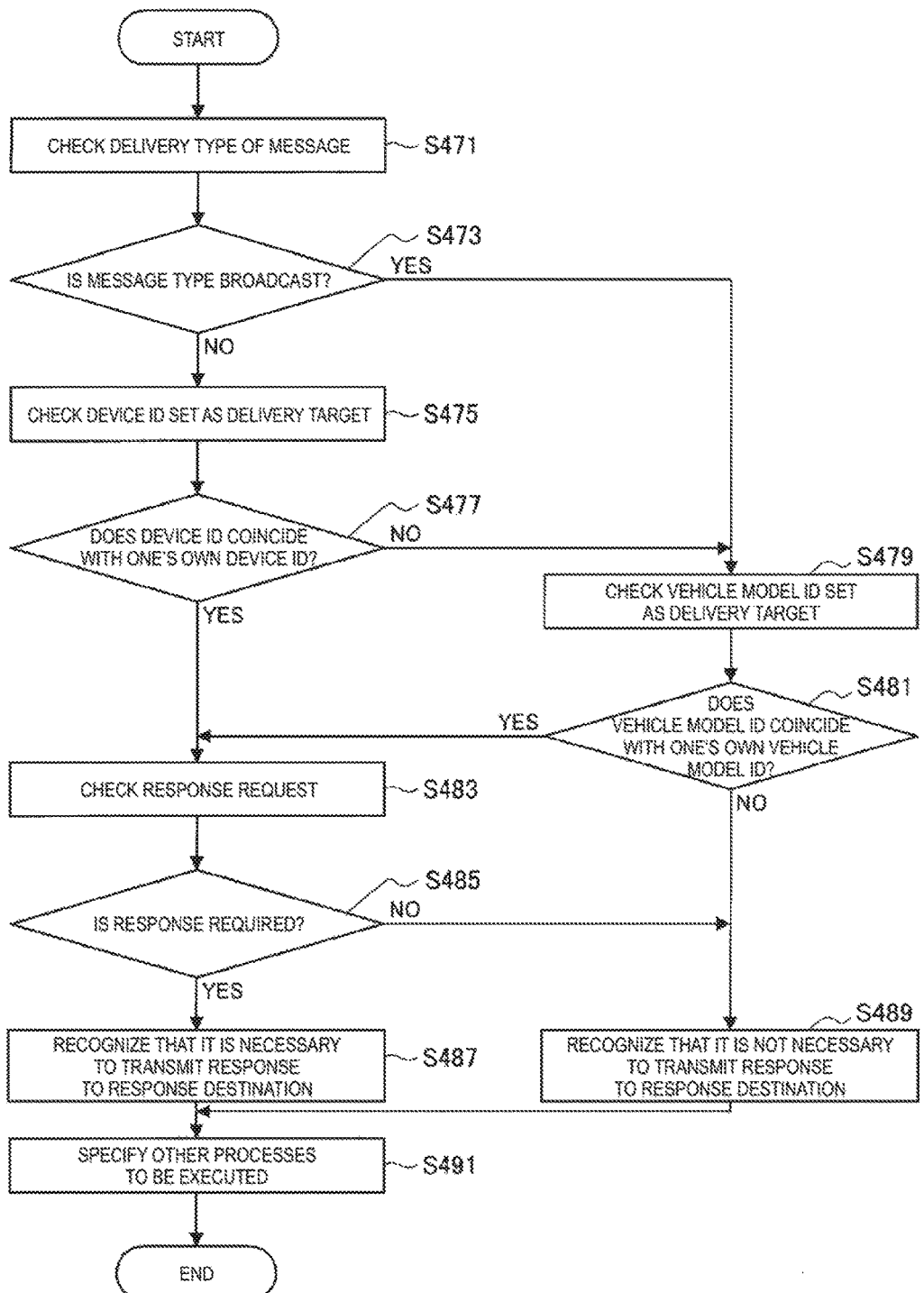
FIG. 19 is a flowchart illustrating an example of a flow of a series of processes related to decision of a process to be executed according to content of a delivered message by a terminal device.

First, an example of a flow of a series of a process related to decision of a process to be executed according to the content of the delivered message by the terminal device 300 will be described with reference to FIG. 18 and FIG. 19. FIGS. 18 and 19 are flowcharts illustrating an example of a flow of a series of processes related to decision of a process to be executed according to the content of the delivered message by the terminal device 300.

As illustrated in FIG. 18, upon receiving the message (IE) from the base station 200, the terminal device 300 analyzes the received message and recognizes content of the message (S451). Then, the terminal device 300 specifies a process to be executed in accordance with the content of the message (S470). For example, FIG. 19 is a flowchart illustrating an example of a flow of a series of processes related to specifying of a process to be executed according to the content of the message delivered from the base station 200 by the terminal device 300.

Specifically, the terminal device 300 first checks the delivery type of the delivered message (for example, broadcast, multicast, or the like) (S471).

For example, in a case in which the delivery type of the delivered message is the broadcast (YES in S473), the terminal device 300 updates the vehicle model ID serving as the delivered message set in the delivered message coincides with the vehicle model ID of the vehicle associated with the terminal device 300 (S479). In a case in which the vehicle model ID set in the message coincides with the vehicle model ID of the vehicle associated with the terminal device 300 (NO in S481), the terminal device 300 recognizes that it is not necessary to transmit the response to the response destination of the message (for example, the CBE 410) (S489). On the other hand, in a case in which the vehicle model ID set in the message coincides with the vehicle model ID of the vehicle associated with the terminal device 300 (YES in S481), the terminal device 300 recognizes that the delivery target of the message is the terminal device 300.

Further, in a case in which the delivery type of the delivered message is not the broadcast (for example, the multicast) (NO in S473), the device ID serving as the delivery target set in the delivered message coincides with the device ID of the terminal device 300 (S475). In a case in which the device ID set in the message does not coincide with the device ID of the terminal device 300 (NO in S477), the terminal device 300 checks whether or not the vehicle model ID serving as the delivery target set in the message coincides with the vehicle model ID of the vehicle associated with the terminal device 300 (S479). Further, a process of transition in this case is similar to in the case of the broadcast described above. On the other hand, in a case in which the device ID set in the message coincides with the device ID of the terminal device 300 (YES in S477), the terminal device 300 recognizes that the terminal device 300 is the delivery target of the message.

Then, in a case in which the terminal device 300 is recognized as the delivery target of the message ((YES in S477) or (YES in S481)), the terminal device 300 checks whether or not the response to the message is requested (S483). Further, the presence or absence of the request for the response to the message can be decided on the basis of for example, corresponding information in the delivered message (for example, information corresponding to "Response Requirements" in the IF shown in Table 2).

Further, in a case in which the response to the message is requested (YES in S485), the terminal device 300 recognizes that it is necessary to transmit the response to the response destination of the message (for example, the CBE 410) (S487). On the other hand, in a case in which the response to the message is not requested (YES in S485), the terminal device 300 recognizes that it is not necessary to transmit the response to the response destination of the message (for example, the CBE 410) (S489).

Further, in a case in which an action other than the response to the message is requested, the terminal device 300 specifies the process to be executed on the basis of the request (S491).

Then, as illustrated in FIG. 18, the terminal device 300 executes the process specified in accordance with the content of the message (S453).

Specifically, in a case in which the terminal device 300 recognizes that it is necessary to transmit the response to the response destination of the message, information used for directly accessing the response destination may be presented to the user as the process related to the response. Further, as another example, the terminal device 300 transmits the message for the response (hereinafter also referred to as a "response message") associated with the address of the response destination to the base station 200 as the process related to the response to the response destination of the message. Further, an operation related to the transmission of the response message to the base station 200 by the terminal device 300 will be described later in detail.

Further, as another example, the terminal device 300 may present the report information corresponding to the content of the message to the user. Further, the terminal device 300 may control the operation of the vehicle associated with the terminal device 300 in accordance with the content of the message. Further, the presentation of the report information or the control of the operation of the vehicle according to the content of the message by the terminal device 300 will be described later in detail.

Further, as described above, the response destination of the message is not necessarily limited to the CBE 410 which is the delivery source of the message. As a specific example, in a case in which the server that collects the response to the message is installed separately from the CBE 410, the server may be set as the response destination of the message. In this case, for example, information related to the server serving as the response destination of the message is preferably set as the information for accessing the delivery source of the message such as "Response URL" or "Response Address" in the IE for the information delivery request described above with reference to Table 2, The example of the flow of a series of processes related to the decision of the process to be executed according to the content of the delivered message by the terminal device 300 has been described with reference to FIGS. 18 and 19.

(Response to Message)

Figure 20:
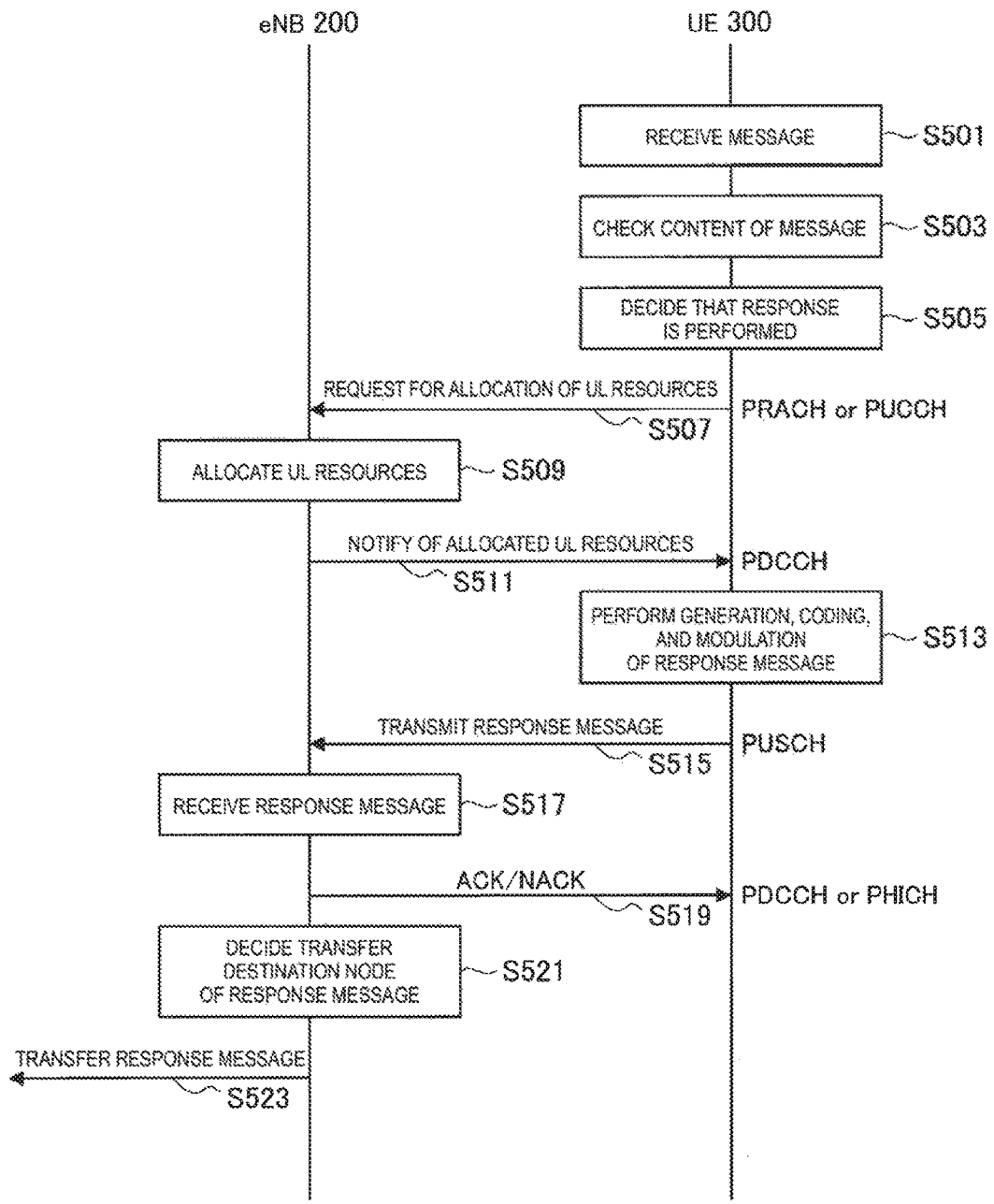
FIG. 20 is a sequence diagram illustrating an example of a flow of a series of processes in a case in which a terminal device transmits a response to a delivered message to a base station.

Next, an example of a flow of a series of processes in a case in which the terminal device 300 returns the response to the delivered message to the base station 200 will be described with reference to FIG. 20. FIG. 20 is a sequence diagram illustrating an example of a series of processes flow in a case in which the terminal device 300 returns the response to the delivered message to the base station 200.

As illustrated in FIG. 20, upon receiving the message delivered from the base station 200 (S501), the terminal device 300 analyzes the received message and recognizes the content of the message (S503). Further, the terminal device 300 recognizes whether or not the response to the message is requested on the basis of the recognition result of the content of the message, and in a case in which the response is requested, the terminal device 300 decides to perform the response (S505). Here, the terminal device 300 is described as transmitting the response message to the base so station 200 as the response to the delivered message.

In a case in which the response to the message is decided to be performed, the terminal device 300 first requests the base station 200 to allocate uplink (UL) resources for the response (S507). Further, the request related to the allocation of the UL resources from the terminal device 300 to the base station 200 is performed through, for example, a physical random access channel (PRACH) or a physical uplink control channel (PUCCH).

Upon receiving the UL resource allocation request from the terminal device 300, the base station 200 allocates the UL resources to the terminal device 300 (S509). Here, the UL resources may include radio resources such as, for example, frequency resources (a resource block, a subchannel, a subcarrier, or the like), time resources (a radio frame, a subframe, a slot, or the like). Further, as the UL resources, for example, a physical uplink shared channel (PUSCH) is used. Then, the base station 200 gives a notification indicating the allocated UL resources to the terminal device 300 (S511). Further, the notification of the UL resources from the base station 200 to the terminal device 300 is performed, for example, through a physical downlink control channel (PDCCH) or the like.

Upon receiving the notification indicating the UL resources from the base station 200, the terminal device 300 generates a response message for transmitting the response to the message to the base station 200 (eventually, transmitting it to the CBE 410 via the base station 200, the MME 450, and the CCB 430). For example, Table 3 shown below indicates an example of a data structure of an IE (that is, an IE of the response message) for transmitting the response to the delivered message.

TABLE 3

Example of information elements of response message
Information Elements

Message ID
(information delivery request, information delivery response, or the like)
Received Message Type ID TABLE 3-continued Example of information elements of response message
Information Elements (recall or the like)
Emergency Level ID
(urgent, normal, or the like)
Subscriber IDs
(device ID, IMSI, TMSI, or the like)
Vehicle ID
ACK or NACK
Reserve Field In Table 3, "Message ID" is identification information identifying a type of each IE and corresponds to "Message ID" in the IE for the information delivery request shown in Table 2. Further, in the IE of the response message, identification information indicating the "information delivery response" is set in "Message ID." Further, "Message Type ID" and "Emergency Level ID" correspond to "Message Type ID" and "Emergency Level ID" in the IE for the information delivery request shown in Table 2, respectively. In other words, information corresponding to "Message Type ID" and "Emergency Level ID" in the delivered message is set in "Message Type ID" and "Emergency Level ID" in the IE of the response message.

Further, "Subscriber IDs" is information corresponding to the terminal device 300 which is the transmission source of the response message, and a device ID such as IMSI, TMSI, or the like is set. Further, "Vehicle ID" is information indicating the vehicle model of the vehicle associated with the terminal device 300.

Then, the terminal device 300 performs coding and modulation on the response message so that the generated response message is transmitted to the base station 200 via the UL resources notified from the base station 200 (S513). Then, the terminal device 300 transmits the response message which has undergone the coding and modulation to the base station 200 (S515).

Then, the base station 200 attempts to receive the response message from the terminal device 300 (S517), and transmits an ACK or a NACK to the terminal device 300 depending on a reception result of the response message (S519). Further, the transmission of the ACK or the NACK from the base station 200 to the terminal device 300 is performed through, for example, the PDCCH or a physical HARQ indicator channel (PHICH). Then, the base station 200 decides a node (for example, the MME 450) serving as a transfer destination of the received response message (S521) and transfers the response message to the node (S523).

The example of the flow of a series of processes in a case in which the terminal device 300 transmits the response to the delivered message to the base station 200 has been described above with reference to FIG. 20.

(Notification to User)

Next, an example of an operation in which the terminal device 300 reports information to the user in accordance with the content of the delivered message will be described with reference to FIGS. 21 to 24. For example, FIG. 21 is an explanatory diagram for describing an example of an information report form from the terminal device 300 to the user.

Figure 21:
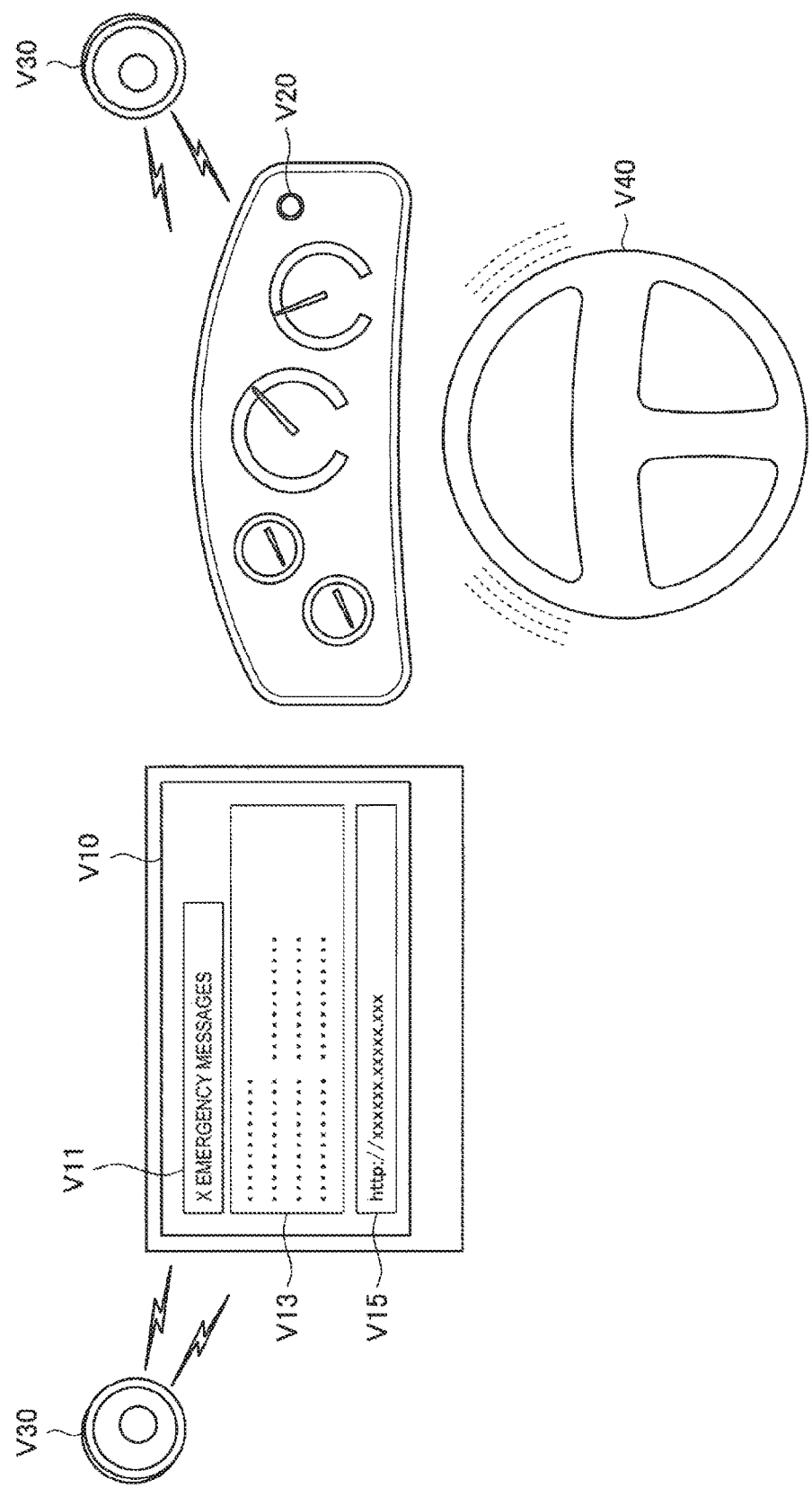
FIG. 21 is an explanatory diagram for describing an example of a report form of information from a terminal device to a user.

In FIG. 21, as indicated by reference numeral V10, the terminal device 300 may present the report information in accordance with the content of the delivered message through, for example, a display unit such as a display of an in-vehicle device such as a navigation device or a screen installed in the vehicle to the user. As a more specific example, the terminal device 300 may present information V11 indicating that the message has been received or text information V13 (that is, the body of the message) included in the message as display information through the display unit.

Further, in a case in which a URL for accessing the response destination of the message is included in the message, the terminal device 300 may urge the user to refer to a link destination indicated by the URL (for example, a web page of the response destination) by presenting the URL through the display unit as indicated by reference numeral V15. Further, in a case in which the display unit includes a touch panel, the terminal device 300 may present an interface (for example, a button, or the like) for activating a function (for example, a browser or the like) in order to access the link destination indicated by the URL through the display unit. With such a configuration, the user can manipulate the interface presented on the display unit, access the web page of the response destination of the message, and transmits the response to the message.

Further, as another example, the terminal device 300 may report the reception of the message to the user by presenting a predetermined icon on a dashboard or turning on a light emitting diode (LED) or the like as indicated by reference numeral V20. Further, the terminal device 300 may give a notification indicating that the message has been received to the user by outputting a voice or a sound through an acoustic device such as an in-vehicle speaker as indicated by reference numeral V30. Further, the terminal device 300 may give a notification indicating that the message has been received to the user, for example, by causing a device (for example, a device to be gripped) manipulated by the user such as a handle as indicated by the reference numeral V40.

Further, the report method described above is merely an example, and the report method is not necessarily limited to the example described above. Further, it is not necessary to limit a method of reporting information to only one method, and, for example, a plurality of methods may be combined.

Figure 22:
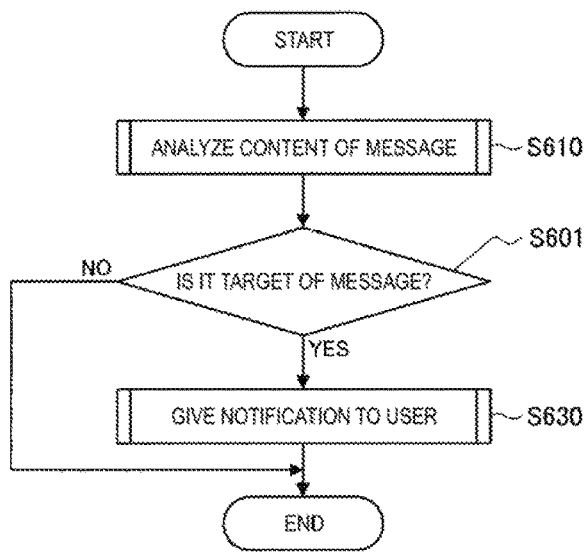
FIG. 22 is a flowchart illustrating an example of a flow of a series of operations in a case in which a terminal device reports information to a user in accordance with content of a delivered message.
Figure 23:
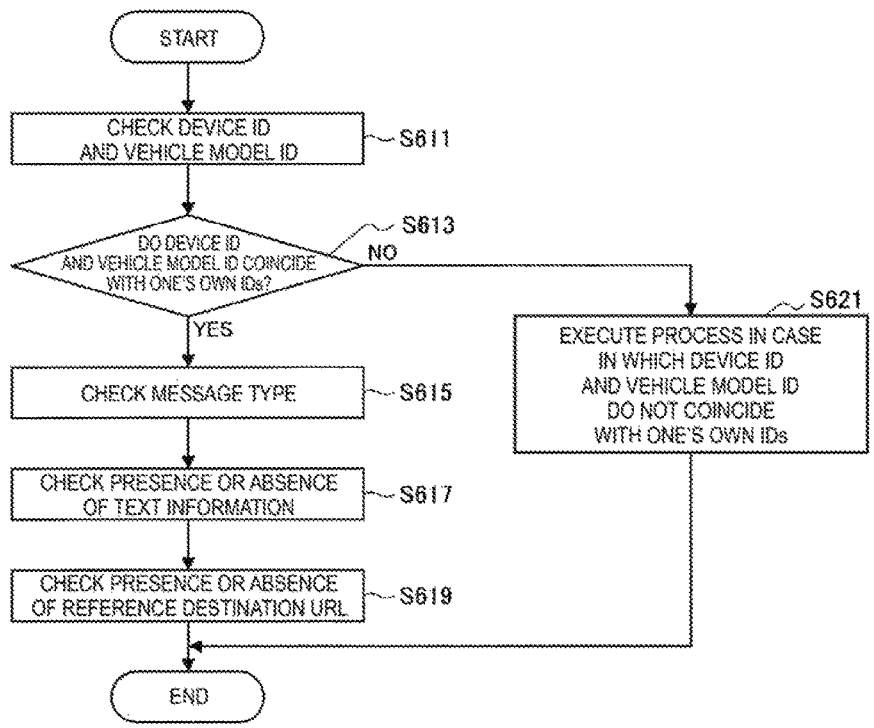
FIG. 23 is a flowchart illustrating an example of a flow of a series of operations in a case in which a terminal device reports information to a user in accordance with content of a delivered message.
Figure 24:
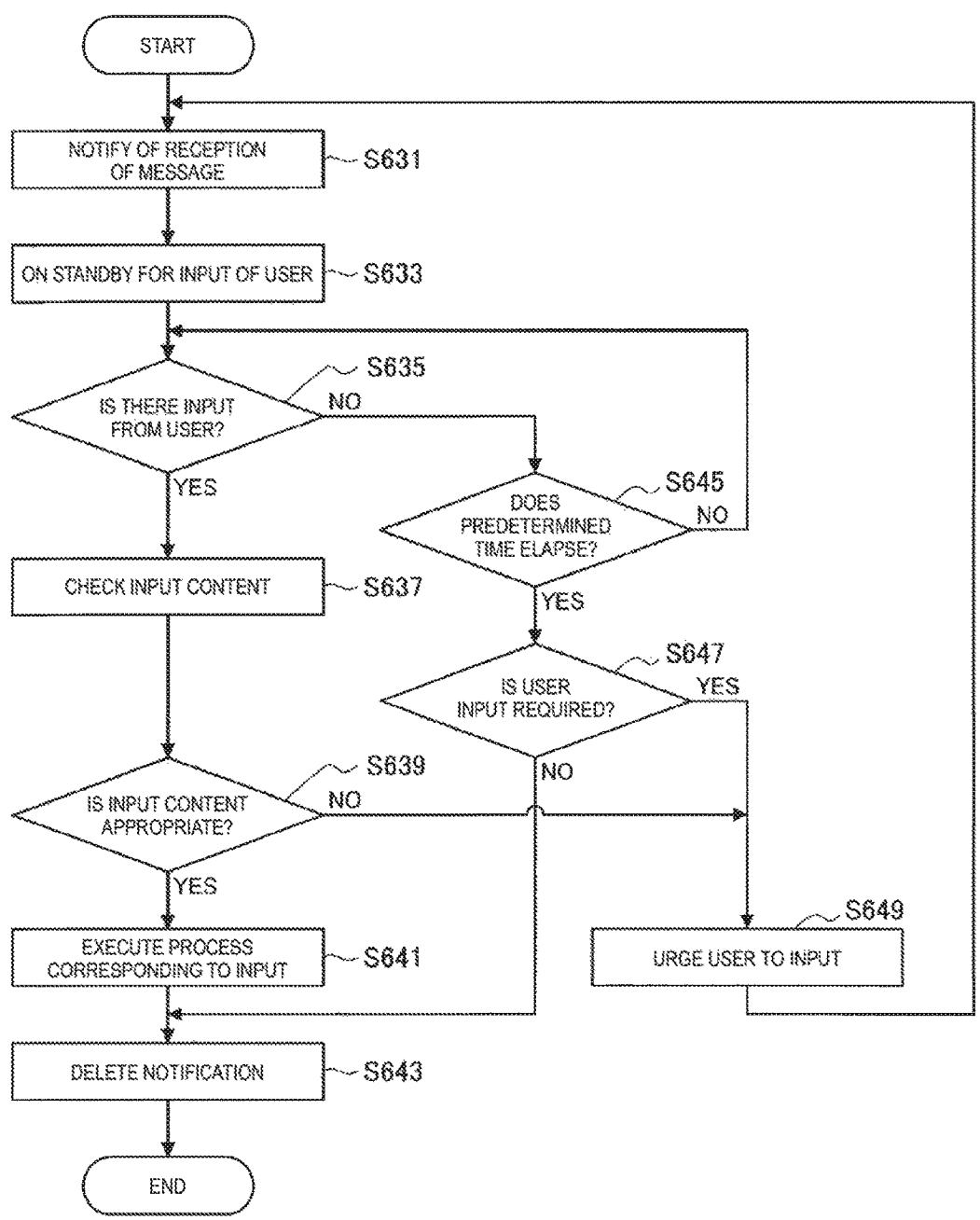
FIG. 24 is a flowchart illustrating an example of a flow of a series of operations in a case in which a terminal device reports information to a user in accordance with content of a delivered message.

Next, an example of a flow of a series of an operation in a case in which the terminal device 300 reports information to the user in accordance with the content of the delivered message will be described with reference to FIGS. 22 to 24. FIGS. 22 to 24 are flowcharts illustrating an example of a flow of a series of operations in a case in which the terminal device 300 reports information to the user in accordance with the content of the delivered message.

As illustrated in FIG. 22, upon receiving the message delivered from the base station 200, the terminal device 300 first analyzes the content of the received message (S610). For example, FIG. 23 illustrates an example of a flow of a process related to the analysis of the message by the terminal device 300.

Specifically, the terminal device 300 first checks the device ID and the vehicle model ID serving as the delivery targets of the received message (S611), and in a case in which the vehicle model ID and the device ID coincide with an ID of the terminal device 300 (that is, the device ID of the terminal device 300 and the vehicle model ID of the vehicle associated with the terminal device 300) (S613).

In a case in which the device ID and the vehicle model ID serving as the delivery target of the message coincide with the ID of the terminal device 300 (YES in S613), the terminal device 300 checks whether or not the message type (for example, the recall information, or the like) requires urgency, the presence/absence of text information, the presence/absence of a reference destination URL, or the like (S615 to S619).

On the other hand, in a case in which the device ID and the vehicle model ID serving as the delivery target of the message do not coincide with the ID of the terminal device 300 (NO in S613), the terminal device 300 may skip, for example, various kinds of processes indicated by S615 to S619. Further, at this time, in a case in which a predetermined process corresponding to the case in which the device ID and the vehicle model ID serving as the delivery target of the message do not so coincide with the ID of the terminal device 300 is set, the terminal device 300 may executes the process (S621).

Then, as illustrated in FIG. 22, the terminal device 300 determines whether or not the terminal device 300 corresponds to the target of the message on the basis of a result of analyzing the content of the message (S601). In a case in which the terminal device 300 does not correspond to the target of the message (NO in S601), the terminal device 300 ends a series of processes. On the other hand, in a case in which the terminal device 300 corresponds to the target of the message (YES in S601), the terminal device 300 notifies the user of information corresponding to the content of the message (S630). For example, FIG. 24 illustrates an example of a flow of a process in which the terminal device 300 notifies the user of information corresponding to the content of the message.

Specifically, first, the terminal device 300 reports the reception of the message to the user through various kinds of devices (for example, as described above with reference to FIG. 21) (S631) and is on standby for an input from the user who has received the report (S633). Further, examples of the input from the user include a manipulation for referring to the message and a manipulation for referring to the link destination such as the URL.

In a case in which an input from the user is received (YES in S635), the terminal device 300 checks whether or not input content is appropriate (for example, whether or not it is a valid input) (S637). In a case in which the input content is recognized to be appropriate (YES in S639), the terminal device 300 executes a process corresponding to the input content. Further, in a case in which the terminal device 300 executes the process corresponding to the input content from the user, the terminal device 300 may delete a notification related to the corresponding message (S643).

On the other hand, in a case in which the input content of the input from the so user is recognized not to be appropriate (NO in S639), the terminal device 300 may urge the user to input appropriate content (that is, content valid as an input) (S649). In this case, the terminal device 300 is on standby for an input from the user again.

Further, in a case in which the input from the user is not detected (NO in S635), the terminal device 300 is on standby for an input from the user until a predetermined time elapses (NO in S645), and after the predetermined time elapses (YES in S645), the terminal device 300 may recognize that the user input is not performed. Further, in this case, the terminal device 300 may switch a subsequent process depending on whether or not the corresponding message requires a user input. Further, examples of a case in which the user input is required include a case in which the delivered message requires urgency and a case in which the delivered message requests the response.

For example, in a case in which the corresponding message requires the user input (YES in S647), the terminal device 300 may urge the user to input information (S649). In this case, the terminal device 300 may repeat a notification of urging the user to input the information, for example, until the input from the user is obtained. Further, an upper limit may be set to the number of times that the terminal device 300 repeats the notification of urging the user to input the information.

On the other hand, in a case in which the corresponding message does not require the user input (NO in S647), the terminal device 300 may delete the notification related to the corresponding message (S643) and end a series of processes related to the notification of the information corresponding to the content of the message.

The example of the operation in which the terminal device 300 reports the information to the user in accordance with the content of the delivered message has been described with reference to FIGS. 21 to 24.

(Control of Vehicle)

Figure 25:
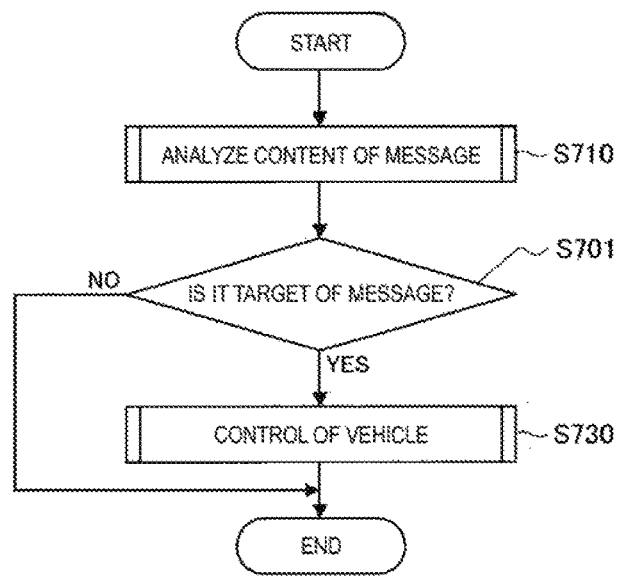
FIG. 25 is a flowchart illustrating an example of a flow of a series of processes in a case in which a terminal device controls an operation of a vehicle in accordance with content of a delivered message.
Figure 26:
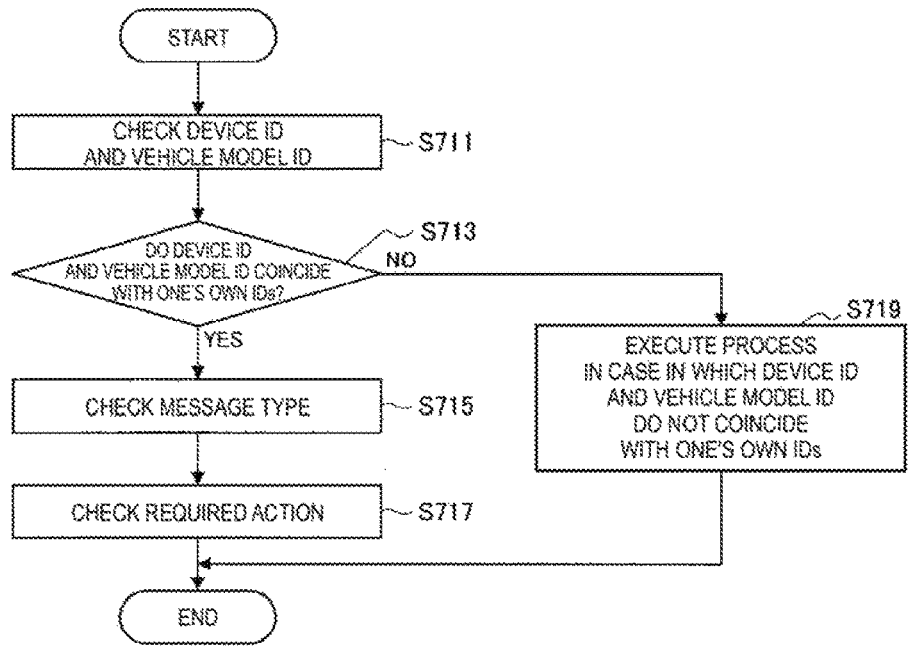
FIG. 26 is a flowchart illustrating an example of a flow of a series of processes in a case in which a terminal device controls an operation of a vehicle in accordance with content of a delivered message.
Figure 27:
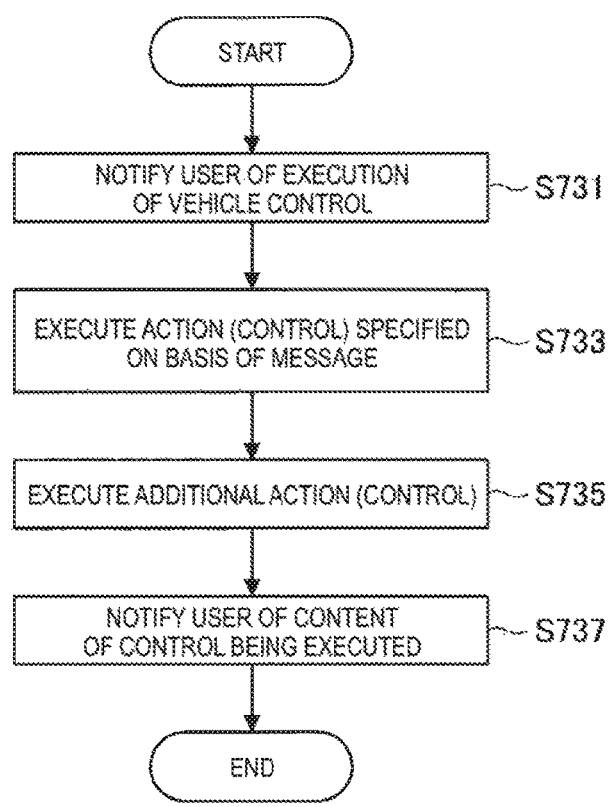
FIG. 27 is a flowchart illustrating an example of a flow of a series of processes in a case in which a terminal device controls an operation of a vehicle in accordance with content of a delivered message.

Next, an example of a flow of a series of processes in a case in which the terminal device 300 controls an operation of the vehicle in accordance with the content of the delivered message will be described with reference to FIG. 25 to FIG. 27. FIGS. 25 to 27 are flowcharts illustrating an example of a flow of a series of processes in a case in which the terminal device 300 controls an operation of the vehicle in accordance with the content of the delivered message.

As illustrated in FIG. 25, upon receiving the message delivered from the base station 200, the terminal device 300 first analyzes the content of the received message (S710). For example, FIG. 26 illustrates an example of a flow of a process related to the analysis of the message by the terminal device 300.

Specifically, the terminal device 300 first checks the device ID and the vehicle model ID serving as the delivery target of the received message (S711), and in a case in which the vehicle model ID and the device ID coincide with the ID of the terminal device 300 (that is, the device ID of the terminal device 300 and the vehicle model ID of the vehicle associated with the terminal device 300) (S713).

In a case in which the device ID and the vehicle model ID serving as the delivery target of the message coincide with the ID of the terminal device 300 (YES in S713), the terminal device 300 checks whether or not the message type (for example, the recall information, or the like) requires urgency, a required action (for example, content of vehicle control, or the like), and the like (S715 and S717).

On the other hand, in a case in which the device ID and the vehicle model ID serving as the delivery target of the message do not coincide with the ID of the terminal device 300 (NO in S713), the terminal device 300 may skip, for example, various kinds of processes indicated by S715 and S717. Further, at this time, in a case in which a predetermined process corresponding to the case in which the device ID and the vehicle model ID serving as the delivery target of the message do not so coincide with the ID of the terminal device 300 is set, the terminal device 300 may executes the process (S719).

Then, as illustrated in FIG. 25, the terminal device 300 determines whether or not the terminal device 300 corresponds to the target of the message on the basis of a result of analyzing the content of the message (S701). In a case in which the terminal device 300 does not correspond to the target of the message (NO in S701), the terminal device 300 ends a series of processes. On the other hand, in a case in which the terminal device 300 corresponds to the target of the message (YES in S701), the terminal device 300 executes control of the vehicle in accordance with the content of the message (S730). For example, FIG. 27 illustrates an example of a flow of a process related to the control of the vehicle in accordance with the content of the message by the terminal device 300.

Specifically, first, the terminal device 300 gives a notification indicating that the control of the vehicle is executed to the user through various kinds of devices by executing the control of the vehicle, for example, as described with reference to FIG. 21 (S731). Further, such a notification plays a role of urging the user to pay attention to the control of the vehicle.

Then, the terminal device 300 executes a specified action (that is, the control of the vehicle) on the basis of the content of the message (S733). Further, the terminal device 300 may execute other actions (for example, additional control to a previously executed control) in addition to the action (control) directly indicated by the delivered message (S735). Then, the terminal device 300 notifies the user of the information indicating the content of the executed control (or the content of the control being executed) through various kinds of devices as described above with reference to FIG. 21 (S737).

The example of the flow of a series of processes in a case in which the terminal device 300 controls the operation of the vehicle in accordance with the content of the delivered message has been described above with reference to FIGS. 25 to 27.

<4.7 Message Delivery List Management>

Figure 28:
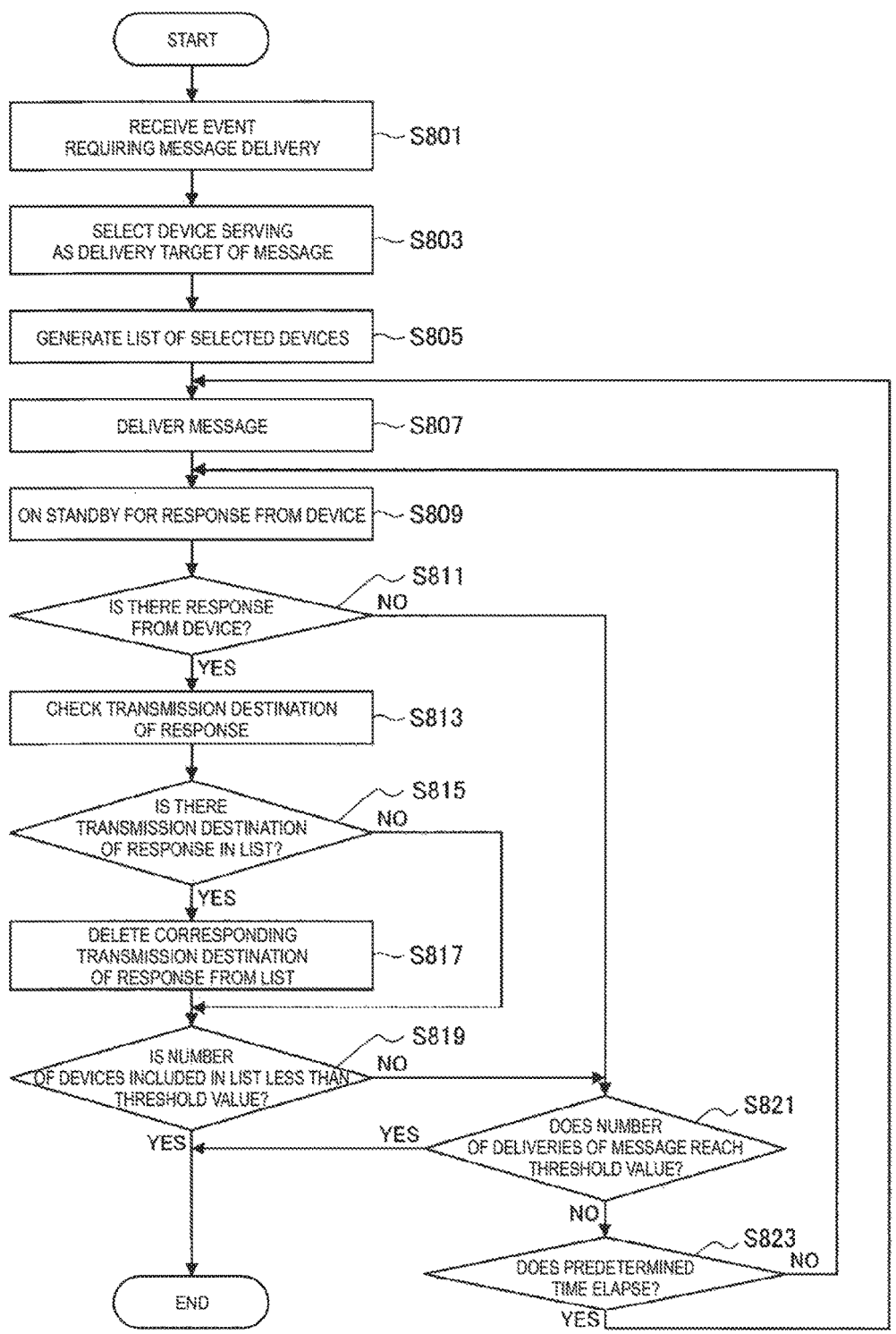
FIG. 28 is a flowchart illustrating an example of a flow of a series of operations related to list management of a delivery destination of a message.

Next, an example of an operation related to a list management of the delivery destination of the message through a component serving as a main entity of the message delivery such as the CBE 410, the CBC 430, the MME 450, or the base station 200 will be described. As described above, there are cases in which the CBE 410, the CBC 430, the MME 450, the base station 200, or the like designates the component subordinate thereto as the destination as in the case of the multicast or the like, delivers the message, and then requests the response from the destination. In this case, it is more preferable to manage the delivery destination of the message (that is, the delivery target of the message) using a list in the component serving as the entity of the message delivery such as the CBE 410, the CBC 430, the MME 450, or the base station 200. In this regard, in this description, an example of a flow of a series of operations related to the list management of the delivery destination of the message will be described with reference to FIG. 28, using a case in which the CBE 410 manages the list as an example. FIG. 28 is a flowchart illustrating an example of a flow of a series of operations related to the list management of the delivery destination of the message.

Specifically, a process related to the list management of the delivery destination related to the delivery of the message starts using an event requiring the delivery of the message as a trigger (S801). More specifically, in a case in which the CBE 410 is the main entity of the list management, for example, a case in which a device (the terminal device 300 or the vehicle) to be recalled is specified, a case in which a device (the terminal device 300 or the vehicle) which is high in a possibility of the occurrence of an accident is specified, or the like correspond to the event serving as the trigger of the process related to the list management. Further, content of the event differs in accordance with the main entity of the list management of the delivery destination related to the delivery of the message. For example, in a case so in which the MME 450 is the main entity, the event corresponds to the reception of the information delivery request transmitted from the higher CCB 430.

Upon receiving the event requiring the message delivery (S801), the CBE 410 first selects a device (the terminal device 300) serving as the delivery target of the message (S803). As a specific example, the CBE 410 selects a corresponding terminal device 300 (or the terminal device 300 associated with the corresponding vehicle) on the basis of a condition such as the vehicle model serving as the delivery target of the message. Then, the CBE 410 generates a delivery destination list on the basis of a selection result of the terminal device 300 serving as the delivery target (S805). In a case in which the CBC 430, the MME 450, or the base station 200 is the main entity that manages the list, the list may be acquired from a component located in a higher layer.

If the delivery destination list is generated, the CBE 410 executes the process related to the delivery of the message (S807). For example, in the case of the CBE 410, the request for the information delivery to the CBC 430 corresponds to the process related to the delivery of the message. In a case in which the process related to delivery of the message is executed, the CBE 410 is on standby for the response to the message from the terminal device 300 serving as the delivery target (S809).

Upon receiving the response to the delivered message (YES in S811), the CBE 410 analyzes the content of the received response, and confirms the terminal device 300 serving as the transmission source (S813). In a case in which the confirmed terminal device 300 is included in the delivery destination list (YES in S815), the CBE 410 deletes information corresponding to the terminal device 300 confirmed from the list. Further, in a case in which the confirmed terminal device 300 is not included in the delivery destination list (NO in S815), the CBE 410 skips the operation related to the deletion of the information from the list.

Further, in a case in which the number of pieces of information related to the terminal device 300 serving as the delivery target of the message included in the delivery destination list is less than a threshold value (YES in S819), the CBE 410 ends the process related to the list management of the delivery destination of the corresponding message. With such control, it is possible to prevent the occurrence of a situation in which, for example, the number of terminal devices 300 of the delivery target is reduced, and the efficiency of the process related to the delivery of the message is reduced. Further, for the terminal device 300 to which the message is not delivered, for example, an action such as transmission of an individual contact or a corresponding message using the unicast may be performed separately.

On the other hand, in a case in which there is no response to the delivered message (NO in S811), the CBE 410 is on standby for the response to the message until a predetermined time elapses (NO in S821) unless the number of deliveries of the message reaches a threshold value (NO in S823). Then, in a case in which a predetermined time elapses (YES in S823), the CBE 410 may retransmit the corresponding message (S807). As described above, the CBE 410 is on standby for the response to the delivered message until the number of deliveries of the message reaches a threshold value. Further, in a case in which the number of deliveries of the message reaches the threshold value (YES in S821), the CBE 410 ends the operation related to the delivery of the message.

Further, as a configuration of the delivery destination list, for example, there is an example shown in Table 4 below.

TABLE 4

Example of delivery destination list for message delivery

| List ID | List generation time | Number of transmissions | cause | Vehicle model ID | Device ID |
|---|---|---|---|---|---|
| 0 | YYYY.MM.DD.hh.mm.ss | 1 | recall (engine) | AAAAAAAA | Aaaaaaaa Bbbbbbbb Ccccccc ... |
| 1 | YYYY.MM.DD.hh.mm.ss | 3 | recall (brake) | XXXXXXXX | Xxxxxxxx Yyyyyyyy Zzzzzzzz ... |
| ... ... | | ... | ... | ... | ... |

As shown in Table 4, the delivery destination list includes various kinds of information such as a list ID, a list generation time, the number of transmissions, a cause, a vehicle model ID, a device ID, and the like. The list ID is identification information individually identifying the delivery destination list generated for each delivered message. Further, the list generation time indicates a date and time at which the delivery destination list of the target message is generated. Further, the number of transmissions indicates the number of transmissions of the corresponding message. Further, the cause indicates an event (cause) which is a cause of the list generation. Further, the vehicle model ID is identification information identifying the vehicle model of the vehicle serving as the delivery target of the message. Further, the device ID is identification information identifying the terminal device 300 serving as the delivery target of the message.

For example, in a case in which the CBE 410 receives the response to the delivered message, the CBE 410 preferably deletes the device ID corresponding to the terminal device 300 from the list shown in Table 4 as information related to the terminal device 300 which is the transmission source of the response. Then, in a case in which the number of device IDs per list identified by the list ID is less than a threshold value, the CBE 410 preferably ends the process related to the delivery of the message corresponding to the list.

Further, in a case in which the message is retransmitted, the CBE 410 adds the number of transmissions in the list shown in Table 4, and in a case in which the number of transmissions reaches a threshold value, the CBE 410 preferably ends the process related to the delivery of the message corresponding to the list.

In a case in which the process related to the delivery of the message ends, the CBE 410 may assign information indicating that the process related to the delivery of the message has ended to the list corresponding to the message. Further, as another example, in a case in which the process related to the delivery of the message ends, the CBE 410 may delete the list corresponding to the message.

Further, as described above, the main entity managing the delivery destination list is not necessarily limited to the CBE 410 and may be any one of the CBC 430, the MME 450, and the base station 200. As a specific example, a component that can recognize the terminal device 300 serving as a delivery target among the CBE 410, the CBC 430, the MME 450, and the base station 200 preferably manages the delivery destination list.

The example of the operation related to the list management of the delivery destination of the message by the component serving as the main entity of the message delivery such as the CBE 410, the CBC 430, the MME 450, or the base station 200 has been described above with reference to FIG. 28.

«5. Application Examples»

The technology of the present disclosure can be applied to various products. For example, the communication control device 100 may be realized as a server of so any type such as a tower server, a rack server, a blade server, or the like. In addition, at least some of these constituent elements of the communication control device 100 may be implemented by a module mounted in a server (e.g., an integrated circuit module configured in one die or a card or a blade inserted into a slot of a blade server).

Further, the base station 200 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 200 may be realized as another type of base station such as a node B or a base transceiver station (BTS). The base station 200 may include a main body that controls radio communication (also referred to as a base station device) and one or more remote radio heads (RRHs) disposed in a different place from the main body. In addition, various types of terminals to be described below may operate as the base station 200 by temporarily or semi-permanently executing the base station function. Further, at least some of constituent elements of the base station 200 may be implemented by the base station device or a module for the base station device.

In addition, the terminal device 300 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 300 may be realized as a terminal that performs machine-to-machine (M2M) communication (also referred to as a machine type communication (MTC) terminal). Furthermore, at least some of constituent elements of the terminal device 300 may be implemented by a module mounted in such a terminal (for example, an integrated circuit module configured in one die).

<5.1. Application Example with Regard to Communication Control Device>

Figure 29:
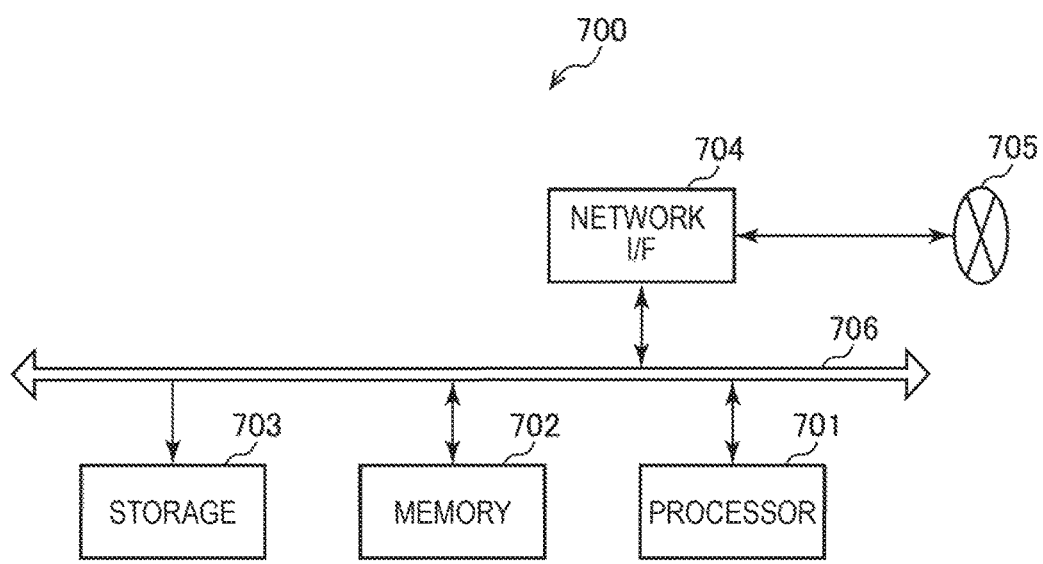
FIG. 29 is a block diagram illustrating an example of a schematic configuration of a server to which the technology of the present disclosure can be applied.

FIG. 29 is a block diagram illustrating an example of a schematic so configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 29, the communication unit 110, the storage unit 120 and the control unit 130 described with reference to FIG. 5 may be implemented by the processor 701. As an example, a program for causing a processor to function as the communication unit 110, the storage unit 120 and the control unit 130 (i.e., a program for causing a processor to execute operations of the communication unit 110, the storage unit 120 and the control unit 130) may be installed in the server 700 and the processor 701 may execute the program. As another example, a module including the processor 701 and the memory 702 may be mounted in the server 700 and the communication unit 110, the storage unit 120 and the control unit 130 may be implemented by the module. In this case, the module may store a program for causing a processor to function as the communication unit 110, the storage unit 120 and the control unit 130 in the memory 702 and the program may be executed by the processor 701. The server 700 or the module may be provided as devices having the communication unit 110, the storage unit 120 and the control unit 130 as described above, or the program for causing a processor to function as the communication unit 110, the storage unit 120 and the control unit 130 may be provided. In addition, a readable recording medium in which the program is recorded may be provided.

<5.2. Application Example with Regard to Base Station]

(First Application Example)

Figure 30:
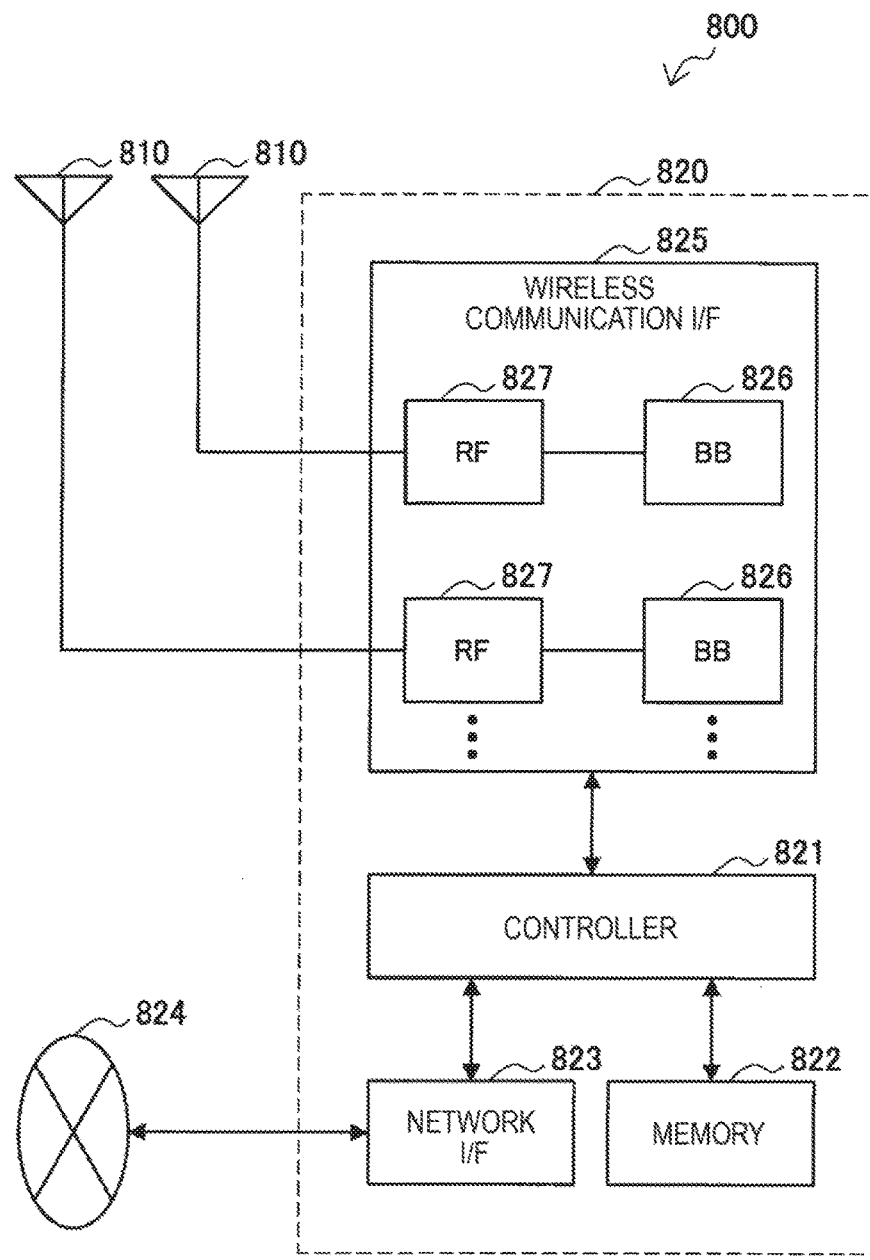
FIG. 30 is a block diagram illustrating a first example of a schematic configuration of an eNB to which the technology of the present disclosure can be applied.

FIG. 30 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 30. For example, the multiple antennas 810 may be compatible with multiple frequency bands used by the eNB 800. Although FIG. 30 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 30. For example, the multiple BB processors 826 may be compatible with multiple frequency bands used by the eNB 800. The wireless communication interface 825 may include the multiple RF circuits 827, as illustrated in FIG. 30. For example, the multiple RF circuits 827 may be compatible with multiple antenna elements. Although FIG. 30 illustrates the example in which the wireless communication interface 825 includes the multiple BB processors 826 and the multiple RF circuits 827, the wireless communication interface 825 may also include a single BB processor 826 or a single RF circuit 827.

In the eNB 800 shown in FIG. 30, the wireless communication unit 210, the network communication unit 220, the storage unit 230 and the control unit 240 described with reference to FIG. 6 may be implemented by the wireless communication interface 825. Alternatively, at least some of these constituent elements may be implemented by the controller 821. As an example, a module which includes a part (for example, the BB processor 826) or all of the wireless communication interface 825 and/or the controller 821 may be mounted in the eNB 800, and the wireless communication unit 210, the network communication unit 220, the storage unit 230 and the control unit 240 may be implemented by the module. In this case, the module may store a program for causing the processor to function as the wireless communication unit 210, the network communication unit 220, the storage unit 230 and the control unit 240 (i.e., a program for causing the processor to execute operations of the one or more constituent elements) and may execute the program. As another example, the program for causing the processor to function as the wireless communication unit 210, the network communication unit 220, the storage unit 230 and the control unit 240 may be installed in the eNB 800, and the wireless communication interface 825 (for example, the BB processor 826) and/or the controller 821 may execute the program. As described above, the eNB 800, the base station device 820 or the module may be provided as a device which includes the one or more constituent elements, and the program for causing the processor to function as the wireless communication unit 210, the network communication unit 220, the storage unit 230 and the control unit 240 may be provided. In addition, a readable recording medium in which the program is recorded may be provided.

In addition, in the eNB 800 shown in FIG. 30, the wireless communication unit 210 described with reference to FIG. 6 may be implemented by the wireless communication interface 825 (for example, the RF circuit 827). Moreover, the network communication unit 220 may be implemented by the controller 821 and/or the network interface 823. Further, the storage unit 230 may be implemented by the memory 822.

(Second Application Example)

Figure 31:
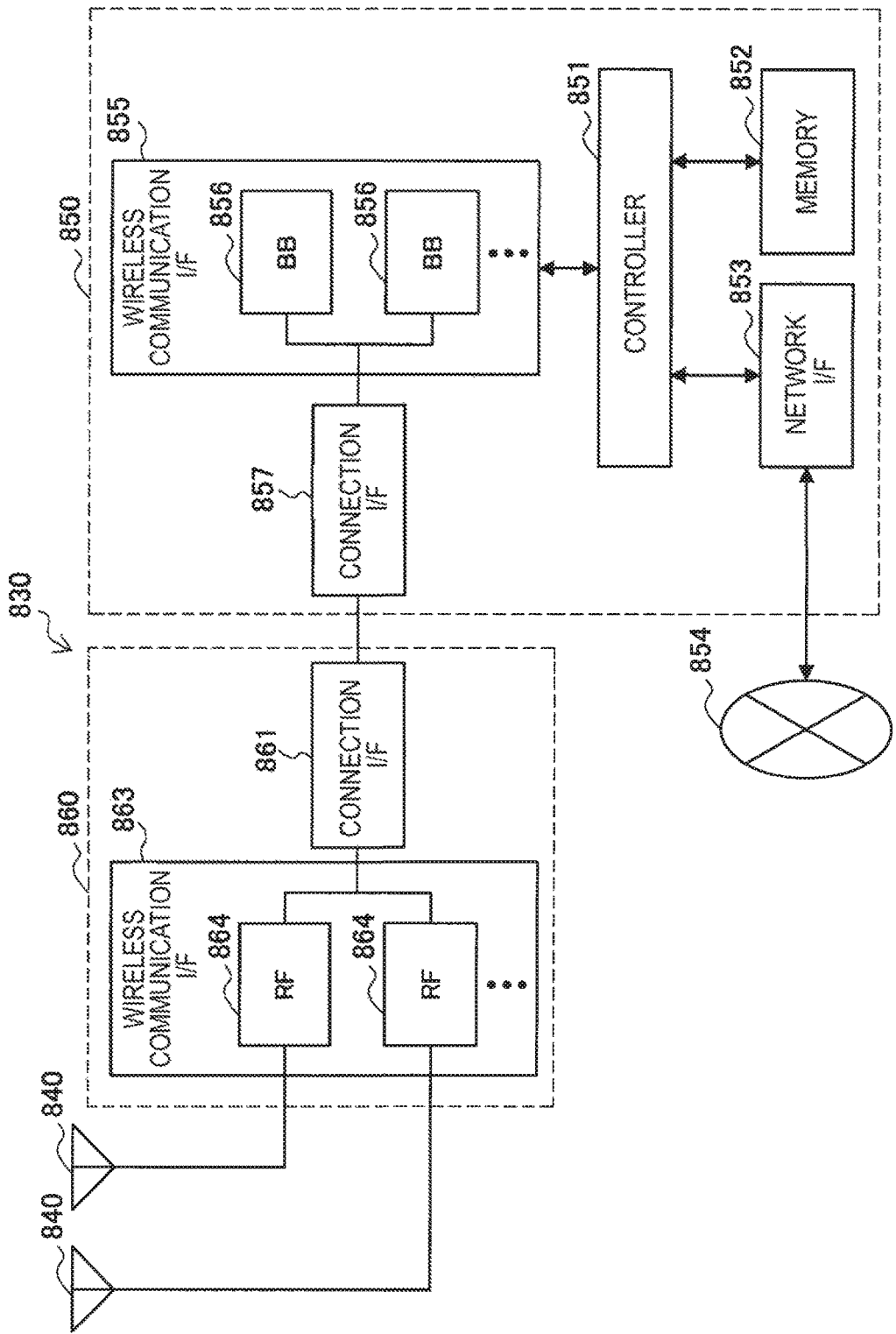
FIG. 31 is a block diagram illustrating a second example of the schematic configuration of the eNB to which the technology of the present disclosure can be applied.

FIG. 31 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 31. For example, the multiple antennas 840 may be compatible with multiple frequency bands used by the eNB 830. Although FIG. 31 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 30.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 30, except the BB processor 856 is connected to the RF circuit 864 of the RRH 860 via the connection interface 857. The wireless communication interface 855 may include the multiple BB processors 856, as illustrated in FIG. 31. For example, the multiple BB processors 856 may be compatible with multiple frequency bands used by the eNB 830. Although FIG. 31 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 31. For example, the multiple RF circuits 864 may support multiple antenna elements. Although FIG. 31 illustrates the example in which the wireless communication interface 863 includes the multiple RF circuits 864, the wireless communication interface 863 may also include a single RF circuit 864.

In the eNB 830 shown in FIG. 31, the wireless communication unit 210, the network communication unit 220, the storage unit 230 and the control unit 240 described with reference to FIG. 6 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in the eNB 830, and the wireless communication unit 210, the network communication unit 220, the storage unit 230 and the control unit 240 may be implemented by the module. In this case, the module may store a program for causing the processor to function as the wireless communication unit 210, the network communication unit 220, the storage unit 230 and the control unit 240 (i.e., a program for causing the processor to execute operations of the one or more constituent elements) and may execute the program. As another example, the program for causing the processor to function as the wireless communication unit 210, the network communication unit 220, the storage unit 230 and the control unit 240 may be installed in the eNB 830, and the wireless communication interface 855 (for example, the BB processor 856) and/or the controller 851 may execute the program. As described above, the eNB 830, the base station device 850 or the module may be provided as a device which includes the wireless communication unit 210, the network communication unit 220, the storage unit 230 and the control unit 240, and the program for causing the processor to function as the wireless communication unit 210, the network communication unit 220, the storage unit 230 and the control unit 240 may be provided. In addition, a readable recording medium in which the program is recorded may be provided.

In addition, in the eNB 830 shown in FIG. 31, the wireless communication unit 210 described, for example, with reference to FIG. 4 may be implemented by the wireless communication interface 863 (for example, the RF circuit 864). Moreover, the network communication unit 220 may be implemented by the controller 851 and/or the network interface 853. Further, the storage unit 230 may be implemented by the memory 852.

<5.3. Application Example with Regard to Terminal Device>

(First Application Example)

Figure 32:
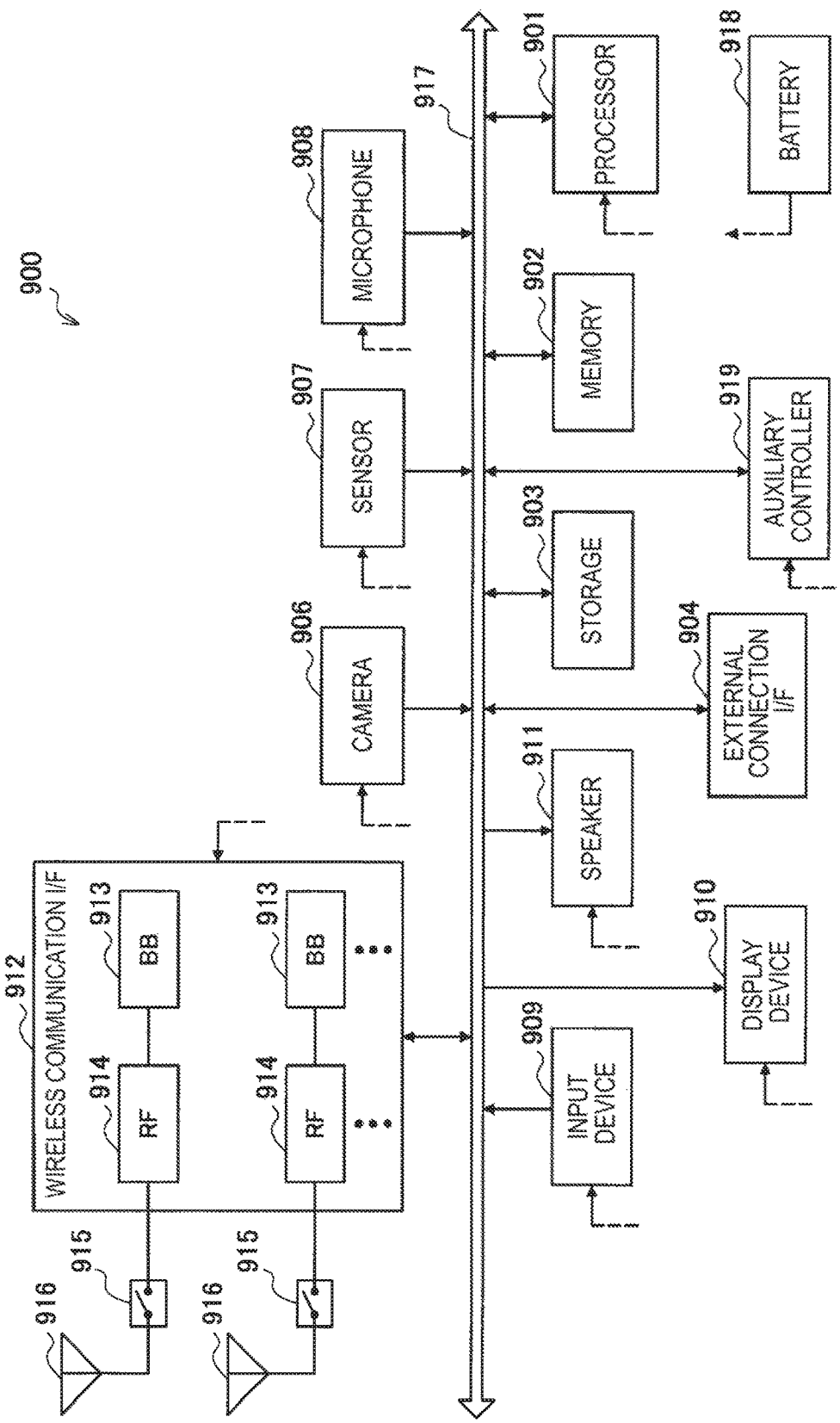
FIG. 32 is a block diagram illustrating an example of a schematic configuration of a smartphone to which the technology of the present disclosure can be applied.

FIG. 32 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 32. Although FIG. 32 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 32. Although FIG. 32 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 32 via feeder lines, which are partially shown as dashed lines in the figure. The auxiliary controller 919 operates a minimum necessary function of the smartphone 900, for example, in a sleep mode.

In the smartphone 900 shown in FIG. 32, the wireless communication unit 310, the storage unit 320, the control unit 330 and the notifying unit 340 described with reference to FIG. 7 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the wireless communication unit 310, the storage unit 320, the control unit 330 and the notifying unit 340 may be implemented by the module. In this case, the module may store a program for causing the processor to function as the wireless communication unit 310, the storage unit 320, the control unit 330 and the notifying unit 340 (i.e., a program for causing the processor to execute operations of the wireless communication unit 310, the storage unit 320, the control unit 330 and the notifying unit 340) and may execute the program. As another example, the program for causing the processor to function as the wireless communication unit 310, the storage unit 320, the control unit 330 and the notifying unit 340 may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the wireless communication unit 310, the storage unit 320, the control unit 330 and the notifying unit 340 may be provided. In addition, a readable recording medium in which the program is recorded may be provided.

In addition, in the smartphone 900 shown in FIG. 32, the wireless communication unit 310 described, for example, with reference to FIG. 7 may be implemented by the wireless communication interface 912 (for example, the RF circuit 914). Moreover, the storage unit 320 may be implemented by the memory 902.

(Second Application Example)

Figure 33:
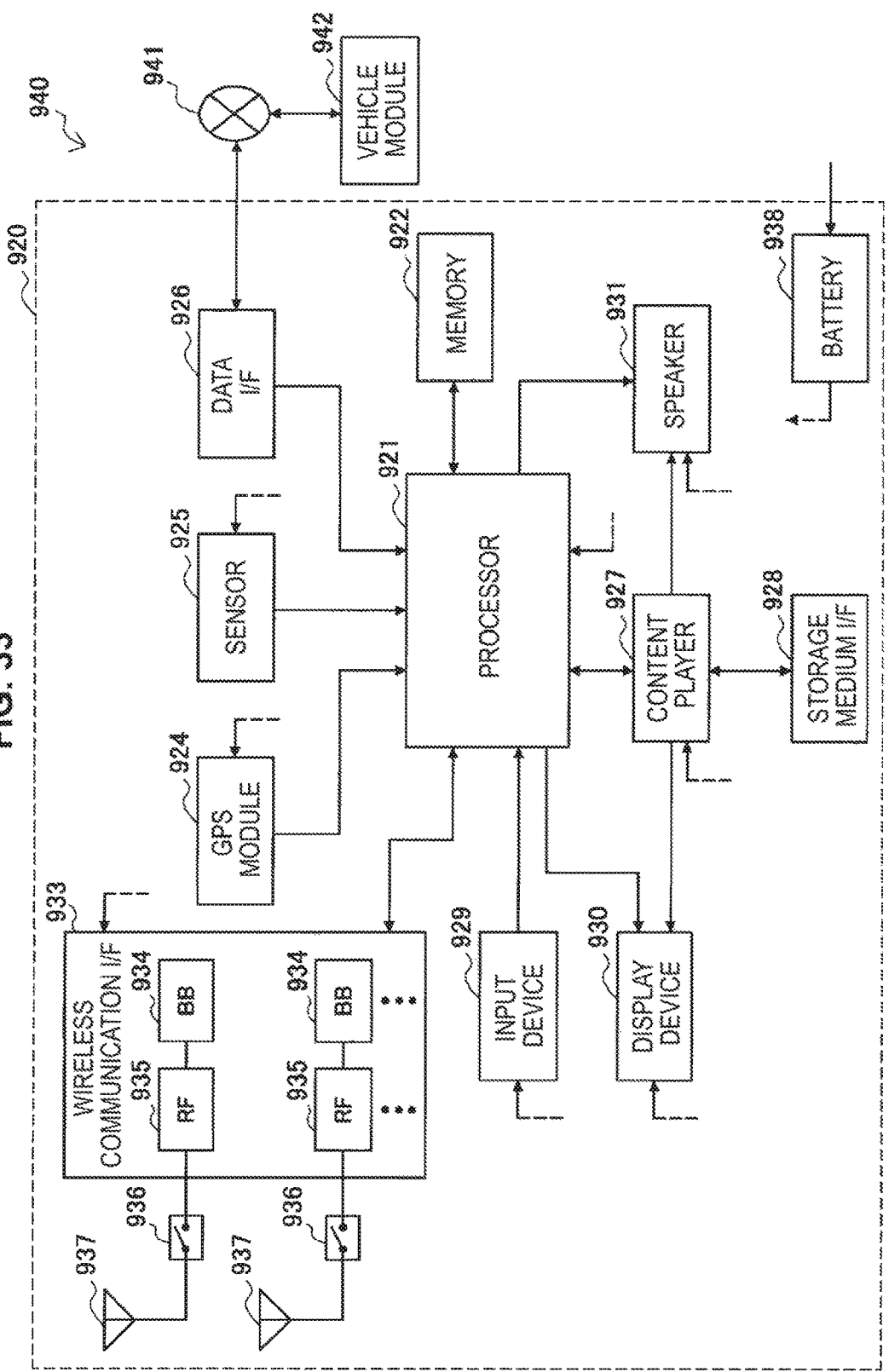
FIG. 33 is a block diagram illustrating an example of a schematic configuration of a car navigation device to which the technology of the present disclosure can be applied.

FIG. 33 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 33. Although FIG. 33 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 33. Although FIG. 33 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 33 via feeder lines that are partially shown as dashed lines in the figure. The battery 938 accumulates power supplied form the vehicle.

In the car navigation device 920 shown in FIG. 33, the wireless communication unit 310, the storage unit 320, the control unit 330 and the notifying unit 340 described with reference to FIG. 7 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the wireless communication unit 310, the storage unit 320, the control unit 330 and the notifying unit 340 may be installed in the car navigation device 920, and the wireless communication interface 933 (for example, the BB processor 934) and/or the processor 921 may execute the program.

As described above, the car navigation device 920 or the module may be provided as a device which includes the wireless communication unit 310, the storage unit 320, the control unit 330 and the notifying unit 340, and the program for causing the processor to function as the wireless communication unit 310, the storage unit 320, the control unit 330 and the notifying unit 340 may be provided. In addition, a readable recording medium in which the program is recorded may be provided.

In addition, in the car navigation device 920 shown in FIG. 33, the wireless communication unit 310 described with reference to FIG. 7, for example, may be implemented by the wireless communication interface 933 (for example, the RF circuit 935). Moreover, the storage unit 320 may be implemented by the memory 922.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the wireless communication unit 310, the storage unit 320, the control unit 330 and the notifying unit 340. The vehicle module 942 generates vehicle data such as vehicle speed, engine speed, and trouble information, and outputs the generated data to the in-vehicle network 941. Note that the vehicle unit 390 described with reference to FIG. 7 corresponds to an example of the vehicle module 942.

«6. Conclusion»

As described above, in the communication system 1 according to the present embodiment, the component serving as the delivery source of the message such as the CBE 410 or the like associates the information used for accessing the response destination of the message (for example, the component, the server that collects response, or the like) with the message and delivers the message to the device subordinate thereto. Further, the terminal device 300 which has received the message delivered from the CBE 410 directly or indirectly transmits the response to the message to the response destination on the basis of the information related to the response destination of the message associated with the received message.

With this configuration, for example, in a case in which the response destination of the message (eventually, the delivery source of the message) does not arrive at the end user who is the delivery target, it is possible to recognize that the message has not arrived at the end user. Accordingly, for example, the delivery source of the message can perform, for example, an additional action of individual accessing for the end user at whom the message has not arrived.

Further, since it is possible to include information related to the action for the event notified as the message such as the control of the vehicle in the message, the action can be performed even on the terminal device serving as the delivery destination of the message.

In other words, according to the communication system of the present embodiment, it is possible to deliver, for example, the safety information related to the vehicle to the end user efficiently and more reliably. Further, even in a case in which the delivered safety information has not arrived at the end user, it is possible to detect this, and thus the delivery source of the safety information can perform an additional action (for example, an action for security assurance) for the end user. Further, according to the communication system of the present embodiment, since it is possible to include information indicating an action for an occurred event in the safety information, the terminal device that has received the safety information can recognize a necessary action for the occurred event and perform the control of the vehicle or the like. The communication system according to the present embodiment can further improve certainty of safety assurance on the basis of such a mechanism.

The preferred embodiment(s) of the present disclosure has/have been described above with reference to the accompanying drawings, whilst the present disclosure is not limited to the above examples. A person skilled in the at may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A device including:

a communication unit configured to perform wireless communication;

an acquiring unit configured to acquire, via the wireless communication, information related to a response destination of a message transmitted from a base station via the wireless communication; and a processing unit configured to execute a process related to a response to the response destination on the message on a basis of the acquired information related to the response destination.

(2)

The device according to (1), in which the processing unit presents information for accessing the response destination to the user to respond to the message on the basis of the acquired information related to the response destination.

(3)

The device according to (1), in which the processing unit transmits a response to the message to the base station via the wireless communication in association with information related to the response destination.

(4)

The device according to any one of (1) to (3), in which the acquiring unit acquires information indicating a delivery destination of the message, and the processing unit determines whether or not the device corresponds to the delivery destination of the message on a basis of the information indicating the delivery destination, and executes the process related to the response to the message in a case in which the device corresponds to the delivery destination of the message.

(5)

The device according to (4), in which, in the case in which the device corresponds to the delivery destination of the message, the processing unit presents information corresponding to content of the message to the user.

(6)

The device according to (4) or (5), in which, in the case in which the device corresponds to the delivery destination of the message, the processing unit controls an operation of a vehicle which is associated in advance in accordance with the content of the message.

(7)

A device including:

a generating unit configured to generate information related to a response destination of a message for executing a process related to a response to the message to the response destination by a terminal corresponding to a delivery target of the message; and a control unit configured to control communication such that the generated information related to the response destination is associated with the message and transmitted to the terminal.

(8)

The device according to (7), in which the control unit limits the delivery target of the message and controls the communication such that the generated information related to the response destination is transmitted only to the terminal corresponding to the limited delivery target in association with the message.

(9)

The device according to (8), in which the control unit limits the delivery target on a basis of a vehicle associated with the message, and controls the communication such that the generated information related to the response destination is transmitted only to the terminal associated with the vehicle in association with the message.

(10)

A device including:

an acquiring unit configured to acquire information related to a response destination of a message for executing a process related to a response to the message to the response destination by a terminal corresponding to a delivery target of the message; and a control unit configured to control communication with another device serving as a control target such that the acquired information related to the response destination is delivered to the terminal.

(11)

The device according to (10), in which the control unit controls the communication such that the message is delivered only to the terminal corresponding to the delivery target on a basis of a list of the delivery targets of the message which is acquired in advance.

(12)

The device according to (11), in which the acquiring unit acquires the list from an acquisition source of the information related to the response destination.

(13)

The device according to (11) or (12), in which the control unit switches a delivery method of the message later on a basis of a result of acquiring a response to the message from the terminal corresponding to the delivery target based on the list.

(14)

The device according to any one of (10) to (13), in which the acquiring unit acquires a response from the terminal corresponding to the delivery target of the message from the other device via the communication, and the control unit controls the communication with an acquisition source of so the information related to the response destination of the message corresponding to the response such that the acquired response is transmitted to the acquisition source.

(15)

A method including:

performing wireless communication;

acquiring, via the wireless communication, information related to a response destination of a message transmitted from a base station via the wireless communication; and executing, by a processor, a process related to a response to the response destination on the message on a basis of the acquired information related to the response destination.

(16)

A method including, by a processor:

generating information related to a response destination of a message for executing a process related to a response to the message to the response destination by a terminal corresponding to a delivery target of the message; and controlling communication such that the generated information related to the response destination is associated with the message and transmitted to the terminal.

(17)

A method including:

acquiring information related to a response destination of a message for executing a process related to a response to the message to the response destination by a terminal corresponding to a delivery target of the message; and controlling, by a processor, communication with another device serving as a control target such that the acquired information related to the response destination is delivered to the terminal.

REFERENCE SIGNS LIST 1 communication system
100 communication control device
110 communication unit
120 storage unit
120 wireless communication unit
130 control unit
200 base station
210 wireless communication unit
220 network communication unit
230 storage unit
240 control unit
300 terminal device
310 wireless communication unit
320 storage unit
330 control unit
340 notifying unit
390 vehicle unit
410 CBE
430 CBC
450 MME

The invention claimed is:

1. A device comprising:
communication circuitry configured to perform wireless communication;
acquiring circuitry configured to acquire, via the wireless communication, information related to a response destination of a message transmitted from a base station via the wireless communication, the response destination being different from the base station; and
processing circuitry configured to execute a process related to a response to the response destination on the message on a basis of the acquired information related to the response destination,
wherein the acquiring circuitry acquires information indicating a delivery destination of the message, wherein the processing circuitry determines whether or not the device corresponds to the delivery destination of the message on a basis of the information indicating the delivery destination, and executes the process related to the response to the message in a case in which the device corresponds to the delivery destination of the message, wherein the processing circuitry controls an operation of an apparatus in accordance with the content of the message, and wherein, in the case in which the device corresponds to the delivery destination of the message, the processing circuitry presents information corresponding to content of the message to the user.

2. The device according to claim 1, wherein the processing circuitry presents information for accessing the response destination to the user to respond to the message on the basis of the acquired information related to the response destination.

3. The device according to claim 1, wherein, in the case in which the device corresponds to the delivery destination of the message, the processing circuitry presents information corresponding to content of the message to the user.

4. A device comprising:
generating circuitry configured to generate information related to a response destination of a message for executing a process related to a response to the message to the response destination by a terminal corresponding to a delivery target of the message; and
control circuitry configured to control communication such that the generated information related to the response destination is associated with the message and transmitted to the terminal,
wherein the response destination is different from a device that transmits the information related to the response destination,
wherein acquiring circuitry of the terminal acquires information indicating a delivery destination of the message,
wherein processing circuitry of the terminal determines whether or not the terminal corresponds to the delivery destination of the message on a basis of the information indicating the delivery destination, and executes the process related to the response to the message in a case in which the terminal corresponds to the delivery destination of the message,
wherein the control circuitry limits the delivery target on a basis of an apparatus which is associated with the message, and
wherein, in the case in which the terminal corresponds to the delivery destination of the message, the processing circuitry presents information corresponding to content of the message.

5. The device according to claim 4, wherein the control circuitry limits the delivery target of the message and controls the communication such that the generated information related to the response destination is transmitted only to the terminal corresponding to the limited delivery target in association with the message.

6. The device according to claim 5, wherein the control circuitry limits the delivery target on a basis of the apparatus which is a vehicle associated with the message, and controls the communication such that the generated information related to the response destination is transmitted only to the terminal associated with the vehicle in association with the message.

7. A device comprising:
acquiring circuitry configured to acquire information related to a response destination of a message for executing a process related to a response to the message to the response destination by a terminal corresponding to a delivery target of the message; and
control circuitry configured to control communication with another device serving as a control target such that the acquired information related to the response destination is delivered to the terminal,
wherein the response destination is different from a device that transmits the information related to the response destination,
wherein acquiring circuitry of the terminal acquires information indicating a delivery destination of the message,
wherein processing circuitry of the terminal determines whether or not the terminal corresponds to the delivery destination of the message on a basis of the information indicating the delivery destination, and executes the process related to the response to the message in a case in which the terminal corresponds to the delivery destination of the message,
wherein the processing circuitry controls an operation of an apparatus in accordance with the content of the message, and
wherein, in the case in which the terminal corresponds to the delivery destination of the message, the processing circuitry presents information corresponding to content of the message.

8. The device according to claim 7, wherein the control circuitry controls the communication such that the message is delivered only to the terminal corresponding to the delivery target on a basis of a list of the delivery targets of the message which is acquired in advance.

9. The device according to claim 8, wherein the acquiring circuitry acquires the list from an acquisition source of the information related to the response destination.

10. The device according to claim 8, wherein the control circuitry switches a delivery method of the message later on a basis of a result of acquiring a response to the message from the terminal corresponding to the delivery target based on the list.

11. The device according to claim 7, wherein the acquiring circuitry acquires a response from the terminal corresponding to the delivery target of the message from the other device via the communication, and
the control circuitry controls the communication with an acquisition source of the information related to the response destination of the message corresponding to the response such that the acquired response is transmitted to the acquisition source.

12. A method, performed by a device, comprising:
performing wireless communication;
acquiring, via the wireless communication, information related to a response destination of a message transmitted from a base station via the wireless communication, the response destination being different from the base station; and
executing, by a processor, a process related to a response to the response destination on the message on a basis of the acquired information related to the response destination,
wherein the acquiring acquires information indicating a delivery destination of the message,
wherein the executing of the process determines whether or not the device corresponds to the delivery destination of the message on a basis of the information indicating the delivery destination, and executes the process related to the response to the message in a case in which the device corresponds to the delivery destination of the message, wherein the controlling controls an operation of an apparatus in accordance with the content of the message, and wherein, in the case in which the device corresponds to the delivery destination of the message, information corresponding to content of the message is presented.

13. A method comprising, by a processor:

generating information related to a response destination of a message for executing a process related to a response to the message to the response destination by a terminal corresponding to a delivery target of the message; and controlling communication such that the generated information related to the response destination is associated with the message and transmitted to the terminal, wherein the response destination is different from a device that transmits the information related to the response destination, the method further comprising:

acquiring, by the terminal, information indicating a delivery destination of the message, determining, by the terminal, whether or not the terminal corresponds to the delivery destination of the message on a basis of the information indicating the delivery destination, and executing the process related to the response to the message in a case in which the terminal corresponds to the delivery destination of the message, limiting the delivery target on a basis of an apparatus which is associated with the message, and wherein, in the case in which the terminal corresponds to the delivery destination of the message, information corresponding to content of the message is presented.

14. A method comprising:

acquiring information related to a response destination of a message for executing a process related to a response to the message to the response destination by a terminal corresponding to a delivery target of the message; and controlling, by a processor, communication with another device serving as a control target such that the acquired information related to the response destination is delivered to the terminal, wherein the response destination is different from a device that transmits the information related to the response destination, the method further comprising:

acquiring, by the terminal, information indicating a delivery destination of the message, determining, by the terminal, whether or not the terminal corresponds to the delivery destination of the message on a basis of the information indicating the delivery destination, and executing the process related to the response to the message in a case in which the terminal corresponds to the delivery destination of the message, and limiting the delivery target on a basis of an apparatus which is associated with the message, and wherein, in the case in which the terminal corresponds to the delivery destination of the message, information corresponding to content of the message is presented.

15. The device according to claim 1, wherein:

the acquiring circuitry acquires the information related to the response destination using a paging message.

16. The method according to claim 12, wherein:

the acquiring acquires the information related to the response destination using a paging message.

* * * * *